US006765691B2

(12) United States Patent
Kubo et al.

(10) Patent No.: US 6,765,691 B2
(45) Date of Patent: Jul. 20, 2004

(54) METHOD AND APPARATUS FOR CONVERTING ORIGINAL IMAGE DATA TO DENSITY DATA FOR FORMING AN IMAGE ON PHOTOSENSITIVE MATERIAL AND FOR DISPLAYING AN IMAGE ON A MONITOR

(75) Inventors: Masahiro Kubo, Kanagawa (JP); Koichi Taniguchi, Tokyo (JP); Naoki Takaoka, Kanagawa (JP); Mamoru Shinohara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/153,918

(22) Filed: Sep. 16, 1998

(65) Prior Publication Data

US 2003/0030825 A1 Feb. 13, 2003

Related U.S. Application Data

(62) Division of application No. 08/746,722, filed on Nov. 15, 1996, now Pat. No. 5,828,461.

(30) Foreign Application Priority Data

Nov. 17, 1995 (JP) ............................................. 7-300098

(51) Int. Cl.[7] ................................................ G06F 15/00
(52) U.S. Cl. .......................... 358/1.9; 358/1.2; 358/1.18
(58) Field of Search ............................ 358/1.1, 1.2, 1.3, 358/1.4, 1.13, 1.15, 1.16, 1.18, 501, 537, 401, 404, 434, 448, 442, 452, 296, 474, 1.9

(56) References Cited

U.S. PATENT DOCUMENTS

| 5,121,195 | A | * | 6/1992 | Seki et al. ..................... 358/75 |
| 5,339,168 | A | * | 8/1994 | Evanitsky et al. .......... 358/402 |
| 5,448,372 | A | * | 9/1995 | Axman et al. .............. 358/342 |
| 5,467,434 | A | * | 11/1995 | Hower, Jr. et al. ......... 395/114 |
| 5,486,895 | A | * | 1/1996 | Leidig et al. ................. 355/50 |
| 5,579,446 | A | * | 11/1996 | Naik et al. .................. 395/109 |
| 5,580,177 | A | * | 12/1996 | Gase et al. .................... 400/61 |
| 5,720,013 | A | * | 2/1998 | Uda ............................ 395/114 |

* cited by examiner

*Primary Examiner*—Mark Wallerson
(74) *Attorney, Agent, or Firm*—Sughrue Mion, PLLC

(57) ABSTRACT

An image processing method in which an image of an original is read by an image input device, the read image data is converted to density data used when printing onto a photosensitive material, and an image is obtained on the photosensitive material by digital exposure, wherein, when the image data is converted to the density data used when printing onto the photosensitive material, the image data is corrected on the basis of parameters determined by combinations of print finish characteristics, including at least image input device characteristics, kind of original, kind of photosensitive material, and exposure amount characteristics, which affect a print image when the image of the original is printed onto the photosensitive material by an analogue exposure system. On the basis of the above parameters, the density data is obtained while the image data is corrected. For this reason, an image finish print in the digital exposure system can obtain an image quality which is equal to that of a finish print in an analogue exposure system.

10 Claims, 14 Drawing Sheets

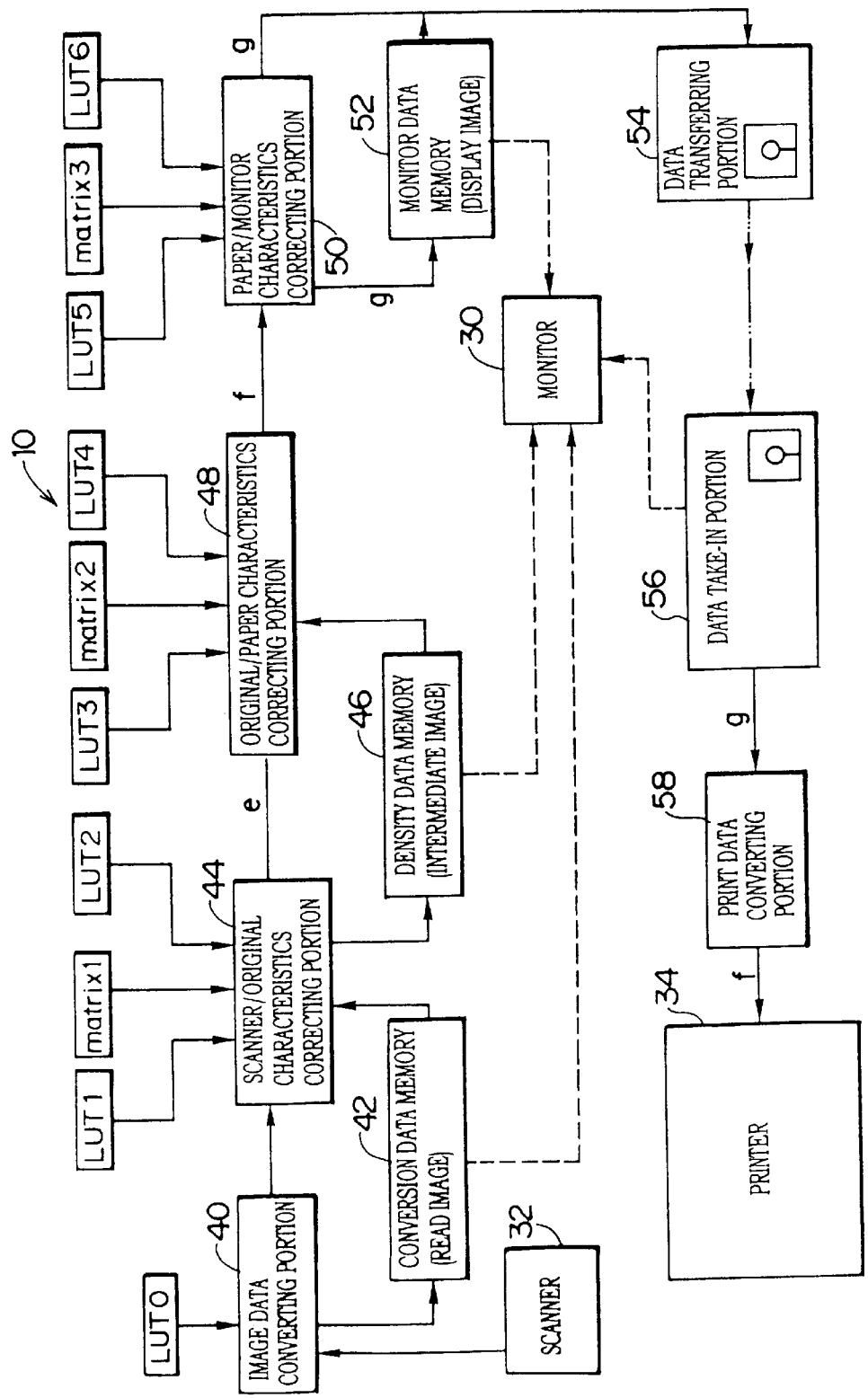
F I G. 2

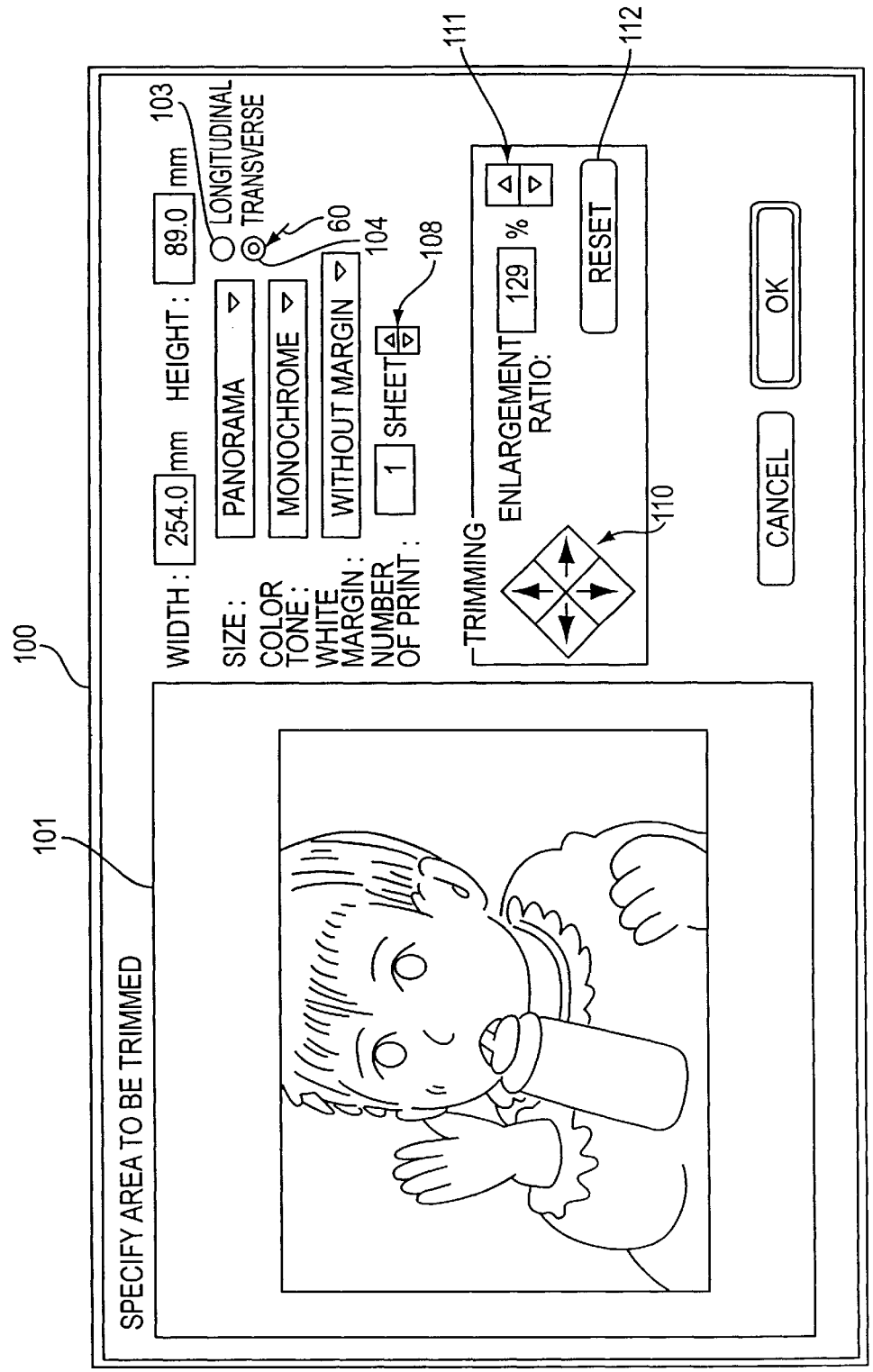

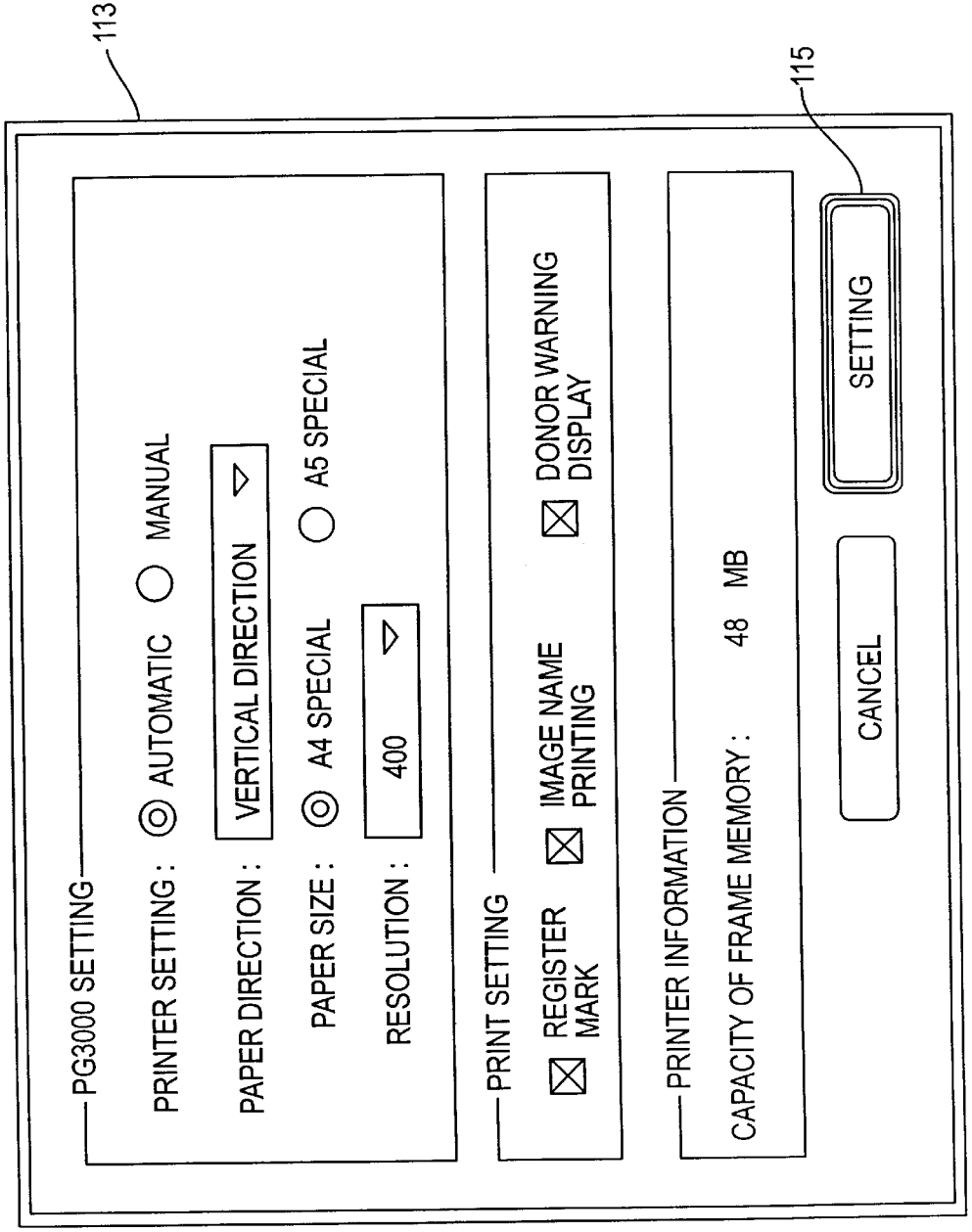

METHOD AND APPARATUS FOR CONVERTING ORIGINAL IMAGE DATA TO DENSITY DATA FOR FORMING AN IMAGE ON PHOTOSENSITIVE MATERIAL AND FOR DISPLAYING AN IMAGE ON A MONITOR

This is a divisional of Application No. 08/746,722 filed Nov. 15, 1996, now U.S. Pat. No. 5,828,461 the disclosure of which is incorporated herein by reference.

BACKGROUND OF THE INVENTION

1. Field of the Invention

The present invention relates to image processing method and apparatus at the time when images recorded on an original such as a photographic print, a photographic film, or the like, are converted to image data by an image input device such as a scanner.

2. Description of the Related Art

Conventionally, in an exposure system in a silver salt photographic technology, printing is generally effected by analogue exposure (i.e., surface exposure: an image is exposed onto a photosensitive material with light being irradiated on an entire surface of an original). Namely, a developed negative film is positioned at a predetermined printing position, light from a white light source (i.e., a halogen lamp or the like) is illuminated on the negative film, and a transmission image from the negative film is imaged (exposed) on a photographic printing paper.

In the analogue exposure system like the above, an image of an original recorded on the negative film can be reproduced faithfully.

On the other hand, in recent years, a so-called digital printer has been technologically improved, in which an image of an original is converted to digital data, subjected to predetermined image processing, and exposed onto a photosensitive material so as to obtain a print image. This makes it possible to prepare an image which is substantially equal to that of the silver salt photography.

In the above-described digital exposure processing, the image of the original is read by a scanner, an image density signal of each of colors of the read image is converted to density data in accordance with spectral sensitivity characteristics of a paper on which the image is printed, and for example, by scanning a semiconductor laser beam, the image is recorded.

By digitizing the image of the original in such a way as described above, various incidental operations (size change, character input, and the like) can be easily effected and it is possible to make a contribution to the development in the field of photography.

However, in the digital exposure processing, practically, a transmission image of a negative film is not printed on a photographic printing paper and the image of the original is read by the scanner. In this case, even when a film of a different type is read, there are some elements which do not exhibit any change in respective density signals of the read image.

Namely, gradation, color tone, and the like are not determined based on the kind of negative film, and are largely influenced by a resolution of the scanner or a resolution of the printer. For this reason, so long as some correction is not made, an image cannot be faithfully reproduced.

Further, there exist various kinds of negative films having different grades (soft gradation, medium gradation, hard gradation, hardest gradation, ultra-hard gradation), different photographic sensitivities, contrast, fog, color sensitivities, image qualities (granularity, resolution, sharpness, MTF (modulation transfer function)), and the like. Even when an image is photographed by using the different kinds of negative films described above, there are some elements which do not exhibit any change in respective density signals of an image read by the scanner.

For example, when different colors are photographed by using a film of which color materials have different spectral distributions, there is a possibility that read density signals becomes the same depending upon the spectral distribution of the scanner. Accordingly, when images are printed on the basis of the image density signals, the images are recorded as entirely the same image.

SUMMARY OF THE INVENTION

In view of the above-described circumstances, it is an object of the present invention to provide image processing method and apparatus in which, when an image is printed by digital exposure processing on the basis of an image of an original, the image is faithfully reproduced with an element added which does not exhibit any change in image data read at the time of reading the image of the original.

A first aspect of the present invention is an image processing method in which an image of an original is read by an image input device, the read image data is converted to density data used when printing onto a photosensitive material, and an image is obtained on the photosensitive material by digital exposure, wherein, when the image data is converted to the density data used when printing onto the photosensitive material, the image data is corrected on the basis of parameters determined by combinations of print finish characteristics, including at least image input device characteristics, kind of original, kind of photosensitive material, and exposure amount characteristics, which affect a print image when the image of the original is printed onto the photosensitive material by an analogue exposure system.

A second aspect of the present invention is an image processing method in which an image of an original is read by an image input device, the read image data is converted to density data used when printing onto a photosensitive material, and an image is obtained on the photosensitive material by digital exposure, wherein, when the image data is converted to the density data used when printing onto the photosensitive material, on the basis of parameters determined by combinations of print finish characteristics, including at least image input device characteristics, kind of original, kind of photosensitive material, and exposure amount characteristics, which affect a print image when the image of the original is printed onto the photosensitive material by an analogue exposure system, the density data used when printing onto the photosensitive material while correcting the image data, and in order to display the image on a monitor, on the basis of the density data, data for monitor display is generated so that gradation and color tone when printing onto the photosensitive material coincide with appearances of gradation and color tone when displayed on the monitor.

In accordance with the above-described first and second aspects, when, for example, a negative film is used as an original, a transmission image of the negative film is read, and on the basis of the read image data, an image is formed on a photographic printing paper by digital exposure, in order to obtain a finish state which is equal to that when printed onto the photographic printing paper serving as a photosensitive material by a printer of an analogue exposure system, the density data is obtained while the image data is being corrected on the basis of the parameters determined by combinations of print finish characteristics. For this reason, an image finish print in the digital exposure can have an image quality which is equal to that of a finish print obtained by the analogue exposure system.

A third aspect of the present invention is an image processing method according to the first or second aspect, in which the exposure amount characteristics is a characteristic of change in printing density caused by a color filter in the analogue exposure system, and on the basis of exposure amount characteristics, the change in printing density is simulated by calculation.

In accordance with the third aspect of the present invention, usually, in the analogue exposure system, a color filter is disposed in a direction in which light from a light source is illuminated, and an amount of exposure for each color is adjusted. Namely, since an amount of light for each of colors can be adjusted by an amount by which each color filter is inserted, even if exposure processing of a fixed time is effected for each of colors, the amount of exposure on the photosensitive material can be practically adjusted for each of colors.

On the other hand, the digital exposure system has no means for directly adjusting an amount of light for each of colors, such as a color filter, and the change in printing density by the color filter is simulated by calculation. Namely, for example, in the case of image recording using a semiconductor laser, or the like, so long as an output ratio of semiconductor laser which forms respective colors is obtained from the exposure amount characteristics, color adjustment can be performed which is equal to that when the color filter is used.

A fourth aspect of the present invention is an image processing method according to the first or second aspect, in which, when the image input device characteristics and kind of original are inputted or selected, image data correcting parameters previously stored on the basis of combinations of the image input device characteristics and kind of original are read out.

In accordance with the fourth aspect of the present invention, correction parameters of the image data are, for example, stored by LUT (look-up table) or the like, in such a manner as to correspond to a plurality of combinations of image input device characteristics and kinds of original. By inputting or selecting the image input device characteristics and the kind of original to be used next, the correction parameters can be read out.

A fifth aspect of the present invention is an image processing method according to the first or second aspect, in which, when the kind of original and kind of photosensitive material to be emulated are inputted or selected, image data correcting parameters previously stored on the basis of combinations of the kind of original and kind of photosensitive material.

In accordance with the fifth aspect of the present invention, the correction parameters of the image data are, for example, stored by LUT (look-up table) or the like, in such a manner as to correspond to a plurality of combinations of kinds of originals and kinds of photosensitive materials to be emulated. By inputting or selecting the kind of original and the kind of photosensitive material to be used next, the correction parameters can be read out.

A sixth aspect of the present invention is an image processing method according to the first or second aspect, in which in a process in which the image data is converted to the density data, the image data inputted from the image input device is stored as read image data, the density data obtained from the image data is stored as intermediate image data, the data for RGB monitor display is stored as display image data, and these stored data can be read out and updated independently.

In accordance with the sixth aspect of the present invention, the read image data, the intermediate image data, and the display image data which are obtained in the process in which the image data is converted to the density data are respectively stored, and then, can be independently read out and updated. After the read image data, the intermediate image data and the display image data are obtained from the image data once read, when affected by the image input device characteristics, processing after the time of reading the read image data is performed. Further, when not affected by the image input device characteristics, processing after the time of reading the intermediate image data is performed.

As a result, it is not necessary to start processing from a first operation of inputting an image of an original, and it is thereby possible to reduce an operating time.

A seventh aspect of the present invention is an image processing method according to the sixth aspect, in which the image input device includes a first mode which operates for at least determination of an effective image area and setting of an enlargement ratio, a second mode which operates for determination of parameters which is needed for converting the image data to the density data on the basis of some image data, and a third mode which operates to convert all image data to the density data, the first mode reading an image of an original at a low resolution and monochromatically, the second mode reading it at a low resolution and chromatically, and the third mode reading it at a high resolution and chromatically.

In accordance with the seventh aspect of the present invention, the first mode is a mode which is set so as to make coincidence between a readable area in the image input device and an image region of an original. For example, when an image which is of a cabinet size which is a photographic size is inputted by using the image input device which is capable of reading an image to a maximum copy size (i.e., A3), it is determined about which portion (i.e., area) of the image data read by the image input device is employed. Meanwhile, since the enlargement ratio also must be considered, the read image does not necessarily have the same size of that of the image of the original. In this case, since detailed image data is not required and color of the image is not also required, it suffices that the image is inputted at a low resolution and by monochromatic scan.

The second mode is a mode which is set to determine each of parameters necessary for conversion to the density data on the basis of the image data. It is not necessary to perform processing at a high resolution, and it suffices that the parameters are determined from some image data (i.e., a portion of all the image data distributed substantially uniformly, and in the present system, the image data is evaluated by the monitor, and the image data having about 256×256 to 512×512 pixels is required for the above number of pixels, 4700×3400). Accordingly, a high-resolution and color-scan processing is performed.

Finally, the third mode is a mode which is set to convert all image data to the density data, and in this case as well, the high-resolution and color-scan processing is performed.

As described above, by altering a scanning form in accordance with each of applications, rapid processing can be achieved.

An eighth aspect of the present invention is an image processing method according to the first or second aspect, in which a portion of an area of a color image inputted by the image input device, including a gray pixel, is displayed in enlargement, and at the same time, one of a plurality of reference gray previously set is selected and displayed, and a color balance amount for each of the inputted pixels is calculated such that a gray pixel within the portion of the area of the color image is finished as a selected reference gray, so that the inputted image data is corrected.

In accordance with the eighth aspect of the present invention, a plurality of reference gray is previously set and stored, and one of them is selected and displayed on the monitor. On the other hand, concurrent display is provided in a state in which some of images inputted by the image input device is enlarged and is compared with the above reference gray. A color balance amount for each of inputted pixels is calculated and corrected so that the gray image within the some image area is finished as the selected reference gray. In this way, the above operation can be performed while the image data and the reference gray are compared with each other on the monitor, and thereby can be effected rapidly and properly.

A ninth aspect of the present invention is an image processing method according to the sixth or seventh aspect, in which a portion of an area of a color image inputted by the image input device, including a gray pixel, is displayed in enlargement, and at the same time, one of a plurality of reference gray previously set is selected and displayed, and a color balance amount for each of the inputted pixels is calculated such that a gray pixel within the portion of the area of the color image is finished as a selected reference gray, so that the inputted image data is corrected.

In accordance with the ninth aspect of the present invention, at the time of reading in the first mode, the density histogram of the image of the original is prepared in the image input device. By setting the dynamic range suitable for the density of the image data on the basis of the density histogram, a proper reading condition can be recognized and reading in the second mode or in the third mode can be performed in a state of highest reading precision such as setting of gradation or the like. Meanwhile, the reading condition means adjustment of a normal reading time, and adjustment of amount of light may also be made as occasion demands.

A tenth aspect of the present invention is an image processing method according to the first or second aspect, in which the parameters obtained by combinations of the print finish characteristics including said image input device characteristics, the kind of original, the kind of photosensitive material, and exposure amount characteristics are independently stored and can be independently edited, the editing including alternation, addition, and deletion.

In the tenth aspect of the present invention, the parameters obtained by combinations of print finish characteristics including the image input device characteristics, the kind of original, the kind of photosensitive material, and the exposure amount characteristics are stored independently as resources. Subsequently, by independently editing the above parameters at the time of setting parameters under a condition similar or proximate to the above, a parameter setting time can be reduced.

An eleventh aspect of the present invention is an image processing method according to the first or second aspect, in which previously-registered kind of original and kind of photosensitive material are displayed on a monitor, and when plural kinds are indicated for any one of an original and a photosensitive material displayed on the monitor, a specified kind of original or photosensitive material is selected and customized, and when there is a single kind of any one of original and photosensitive material previously registered, the single kind is automatically customized.

In accordance with the eleventh aspect of the present invention, the setting procedures of the kind of original and the kind of photosensitive material are provided. When the previously-registered kind of original and kind of photosensitive material are displayed on the monitor and a plurality of the kind of original or photosensitive material is displayed, a specified kind of original or photosensitive material is selected and customized. When a single kind of original or photosensitive material previously registered is displayed, the single kind is automatically customized. As a result, it is possible to easily effect setting of the kind of original and the kind of photosensitive material.

A twelfth aspect of the present invention is an image processing method according to the first or second aspect, in which at least regular size for a photographic print is previously registered as a print image size printed onto the photosensitive material, the number of pixels of the image data is calculated from a size selected from the registered regular size or a size set by inputting numerical values of actual vertical and horizontal dimensions, and from a print output resolution, and a resolution and a reading range at the time of reading the image of the original in said image input device are determined.

In accordance with the twelfth aspect of the present invention, as a print image size to be printed onto a photosensitive material, at least a regular size for a photographic print is previously registered. The number of pixels of the image data can be calculated from the size selected from the registered regular sizes and from the print output resolution, and the resolution and the reading range of the image of the original when read in the image input device can be determined. Meanwhile, for any other sizes than the regular sizes, by numerically inputting actual vertical and horizontal dimensions, the number of pixels of the image data can be calculated from the inputted size and from the print output resolution in the above-described manner.

A thirteenth aspect of the present invention is an image processing method according to the first or second aspect, in which, by displaying, on the monitor, all the images of the original read by the image input device at a desired enlargement ratio with the center of the monitor being set as a reference, and by indexing a print range at the same enlargement ratio in such a manner as to overlap the display images, the indexed print image size and resolution allows calculation of the number of pixels of the image data from the print output resolution, and allows determination of a resolution and a reading range at the time of reading the image of the original in the image input device.

In accordance with the thirteenth aspect of the present invention, the reading image and the print image size, overlapping each other, are displayed on the monitor with the center of the monitor set as a standard. Accordingly, it is possible to recognize the finished state prior to printing, and operating efficiency is thereby improved.

A fourteenth aspect of the present invention is an image processing apparatus comprising: image input means (32) for reading and inputting an image of an original; image data converting means (40) for converting read image data to a surface sequential image format; first correcting means (44) which converts the image data converted by the image data converting means to a luminance signal, and thereafter, to first density data on the basis of the image input means and a characteristic of the image of the original; second correcting means (48) which, after the first density data corrected by the first correcting means is converted to a print exposure amount on the basis of a characteristic of a photosensitive material in which digital exposure processing is effected by the original and the read image data, converts the converted data to second density data used when printing on the photosensitive material; and monitor display data-generating means (50) for monitor display in which the second density data corrected by the second correcting means is converted such that predicted gradation and color tone obtained at the time of analogue exposure on the photosensitive material coincide with those obtained at the time of digital exposure on the photosensitive material and such that appearances of gradation and color tone when displayed on a monitor coincide with those obtained at the time of digital exposure on the photosensitive material, so that monitor display data is generated.

In accordance with the fourteenth aspect of the present invention, an image of an original is inputted by the image input means. The inputted image data is converted to a surface sequential image by the image data converting means. Namely, there is a possibility that, depending upon the kind of image input means, reading processing is performed in a point sequential manner (for example, a scanning device using a semiconductor laser beam), a line sequential manner (for example, so-called slit scanning), and a surface sequential manner (for example, reading by 3CCD color image sensor). Unifying these data allows facilitation of post-processing. Accordingly, by effecting conversion of the image data to the surface sequential image, image processing can be effected for each of colors in the same way as in the analogue exposure system.

The image data converted to the surface sequential image is converted to a linear luminance signal by the first correcting means, and on the basis of combination of spectral sensitivity distribution characteristics of the original-inputting means and the spectral distribution of the original, a coefficient is determined which converts the luminance value of the above luminance signal to a standard luminance value which can be converted by a previously-standardized density value converting means. On the basis of the determined coefficient, the above luminance signal is converted to the first density data.

In the second correcting means, the first density data corrected by the first correcting means is converted to the exposure amount having color tone and gradation based on the combination of the spectral distribution of the original and the spectral sensitivity distribution of the photosensitive material, and the first density data is converted to the second density data on the photosensitive material on the basis of the above exposure amount.

The second density data corrected by the second correcting means is used to generate, by the monitor display data-generating means, RGB monitor display data which coincides with the print density and color onto the photosensitive material.

When the read image data is printed on the basis of the second density data by the data conversion (correction) process, the image data is printed so as to have gradation and color tone which are equal to those when printed by the analogue exposure system. For example, differences in grade (soft gradation, medium gradation, hard gradation, hardest gradation, ultra-hard gradation), photographic sensitivity, contrast, fog, color sensitivity, image quality (granularity, resolution, sharpness, MTF), and the like, which can be conventionally obtained only by the analogue exposure system when the image on the negative film is printed, can be reproduced by the digital exposure (i.e., by using digital image).

On the other hand, when the spectral sensitivity distribution of the image input device or the spectral distribution of the original (for example, a film) is not known, a chart original photographed by proper exposure may be read by the image input device or a measuring device such as densitometer, and converted to the luminance value. Further, it suffices that setting of the above coefficient is effected by using a least squared method or the like.

A fifteenth aspect of the present invention is an image data output method in which, when previously-stored image data to be outputted is specified and transferred to a print output device, a format necessary for printing in the print output device is set and transferred together with the image data, wherein a plurality of kinds of image data to be outputted can be selected and a plurality of kinds of print size for an identical image data can be inputted or selected.

In accordance with the fifteenth aspect of the present invention, when a print is outputted by the print output device, a plurality of image data are selected, and a plurality of kinds of print size can be specified (inputted or selected) for each of the image data. For this reason, information about desired image data and the size thereof is transferred together without waiting until each image print processing is completed. Accordingly, processing efficiency is achieved.

A sixteenth aspect of the present invention is an image data output method according to the fifteenth aspect, in which the image data is stored in such a manner as to be converted to color information when printed on a predetermined photosensitive material, and the color information is obtained by correcting the image data on the basis of parameters determined by combinations of print finish characteristics including at least image input device characteristics, kind of original, kind of photosensitive material, and exposure amount characteristics, which affect a print image when an image of an original is printed onto a photosensitive material by an analogue exposure system.

In accordance with the sixteenth aspect of the present invention, since the specified image data is color information corrected on the basis of the parameters determined by combinations of print finish characteristics, the finished state which is substantially equal to a print obtained by the analogue exposure system can be obtained.

A seventeenth aspect of the present invention is an image data output device in which image data is transferred to a print output device and a format necessary for printing in the print output device is set and transferred together with the image data, comprising: image data storing means for storing a plurality of image data to be outputted; specifying means which specifies desired image data from the image data storing means; print-size setting means which performs one of selecting a print size for each of the image data specified by the specifying means and inputting an actual print size in the print output device; number-of-print setting means which performs one of input and selection of the number of prints for each of the image data specified by the specifying means; and transferring means for transferring, to the print output device, the image data specified by the specifying means, and the print size and number of prints which correspond to the image data.

In accordance with the seventeenth aspect of the present invention, a plurality of kinds of desired image data can be specified by the specifying means and the print size setting means allows setting of a plurality of kinds of print size for each of the specified image data. The plurality of kinds of print size set for each of the plurality of kinds of image data are transferred, together with the number of prints set by the number-of-print setting means, to the print output means by the transferring means. The print output means allows continuous output of set number of prints of the set print size on the basis of the specified image data. As a result, processing efficiency is promoted.

An eighteenth aspect of the present invention is an image data output method according to the seventeenth aspect, in which the image data is stored in the image data storing means in such a manner as to be converted to color information when printed on a predetermined photosensitive material, and the color information is obtained by correcting the image data on the basis of parameters determined by combinations of print finish characteristics including at least image input device characteristics, kind of original, kind of photosensitive material, and exposure amount characteristics, which affect a print image when an image of an original is printed onto a photosensitive material by an analogue exposure system.

In accordance with the eighteenth aspect of the present invention, since the specified image data is color information which is corrected on the basis of the parameters determined by the combinations of print finish characteristics, a finished state which is substantially equal to a print obtained by the analogue exposure system can be obtained.

A nineteenth aspect of the present invention is an image data output method according to the fifteenth aspect, in which, when printing is performed by using at least one print size specified or selected from the plurality of print sizes, layout information is added so that automatic layout is performed on the basis of a size of photosensitive material loaded in the print output device and the format and the image data are transferred to the print output device.

In accordance with the nineteenth aspect of the present invention, the size of a photosensitive material loaded in the print output device is usually relatively large. For this reason, when the photosensitive material is printed irrespective of the set image size, there is a possibility that a blank space becomes large or a portion of the image is not printed. Accordingly, automatic layout is made on the basis of the size of the photosensitive material load in the print output device, and the layout information is transferred to the print output device together with the format and the image data. As a result, a wasted portion of the photosensitive material is eliminated so that the photosensitive material is used effectively.

A twentieth aspect of the present invention is an image data output method according to the fifteenth aspect, in which, when the print size is not inputted or selected, or when a preceding print size is not proper, a regular size which approximates most closely a size of an image of an original when image data is read from the image of the original is automatically selected.

In accordance with the twentieth aspect of the present invention, for example, when the print size is not inputted or selected, a regular size which is closest to a size when the image data is read from the image of the original is automatically selected, and it is possible to save labor such as resetting or the like.

A twenty-first aspect of the present invention is an image data output method according to the fifteenth aspect, in which, when the inputted or selected print size does not coincide with the size of the image data, enlargement, reduction, or trimming of the image data is performed, so that the image data is automatically altered to the inputted or selected print size.

In accordance with the twenty-first aspect of the present invention, when, for example, longitudinal photographic originals and horizontal photographic originals are all inputted as the horizontal image data, and a print of a horizontal size is specified, a print of an image taken from a longitudinal photographic original has blank spaces at left and right sides thereof and respective portions of upper and lower sides of the print are not printed. Accordingly, when the set print size does not coincide with the size of the image data, enlargement, reduction, or trimming of the print size is automatically effected, and at least blank spaces are thereby eliminated. As a result, an appearance of a finished print image is improved.

A twenty-second aspect of the present invention is an image data output method according to the fifteenth aspect, in which, when the image data is color image data, designation of the image data allows conversion from the color image data to monochromatic image data, and when each one is selected from a plurality of gray balance and a plurality of gradation, the color image data is converted to the monochromatic image data on the basis of the selected gray balance and gradation.

In accordance with the twenty-second aspect of the present invention, the color image data can be printed as a monochromatic image. In this case, when each one is selected from a plurality of set gray balance and a plurality of set gradation, the color image data is converted to monochromatic image data on the basis of the selected gray balance and gradation. As a result, an unnatural state of gradation, biasing of gray balance, or the like, which is caused when the color image is changed to the monochromatic image without the gray balance and gradation being based, is prevented, and the monochromatic image is printed so as to have a gradation which is substantially equal to that of a print of the color image.

A twenty-third aspect of the present invention is an image data output method according to the fifteenth aspect, in which presence or absence of a white border in a peripheral portion of the image can be selected when output of prints is performed in the print output device, and when presence of the white border is selected, an index indicating a white border region is printed together with the image, and at the time of printing the index, a character or a mark which specifies the image data is printed.

In accordance with the twenty-third aspect of the present invention, various photosensitive materials are used to perform printing. For this reason, when a white border is formed, there is a possibility that the region of the white border is not clear. Accordingly, an index indicating the white border region is added at the time of image printing, and further, the image data is specified by characters or symbols within the white border region. As a result, when the image can be cut off with the index used as a mark, and an image of a desired size (having the white border) is thereby obtained. Further, since the image with the white border has characters, symbols, or the like, which specify the image data, printed in the white border region, this is convenient for sorting of prints.

Meanwhile, when, as means for sorting images having no white border, a perforation or the like is formed which allows easy cutting of a boundary line between the image and a white border portion which is provided in only a lower side of the image in the vertical direction, the white border portion can easily be eliminated at the time of print sorting.

A twenty-fourth aspect of the present invention is an image data output method according to the above twenty-third aspect, in which layout is automatically set so that the white border region and a non-print region to be formed in a peripheral portion of a photosensitive material in the print output device overlap with each other.

The photosensitive material used in the print output device is constructed in that the entire region thereof is not used as a region in which images can be recorded and a non-image region is provided in a peripheral portion thereof, and a so-called wasted portion exists thereon. However, in the case of an image which requires the white border region, the above non-image portion has the same function as that of the white border. Accordingly, when layout is automatically set such that the white border region and the non-print region formed in the peripheral portion of the photosensitive material overlap each other, the wasted portion of the photosensitive material is effectively utilized.

BRIEF DESCRIPTION OF THE DRAWINGS

FIG. 2 is a functional block diagram showing the photographic image processing system.

FIG. 10 is a schematic diagram showing an example of a display when a trimming setting operation for an image to be printed is effected.

FIG. 12 is a schematic diagram showing an example of a display when a print setting operation is effected.

DESCRIPTION OF THE PREFERRED EMBODIMENTS

Figure 1:
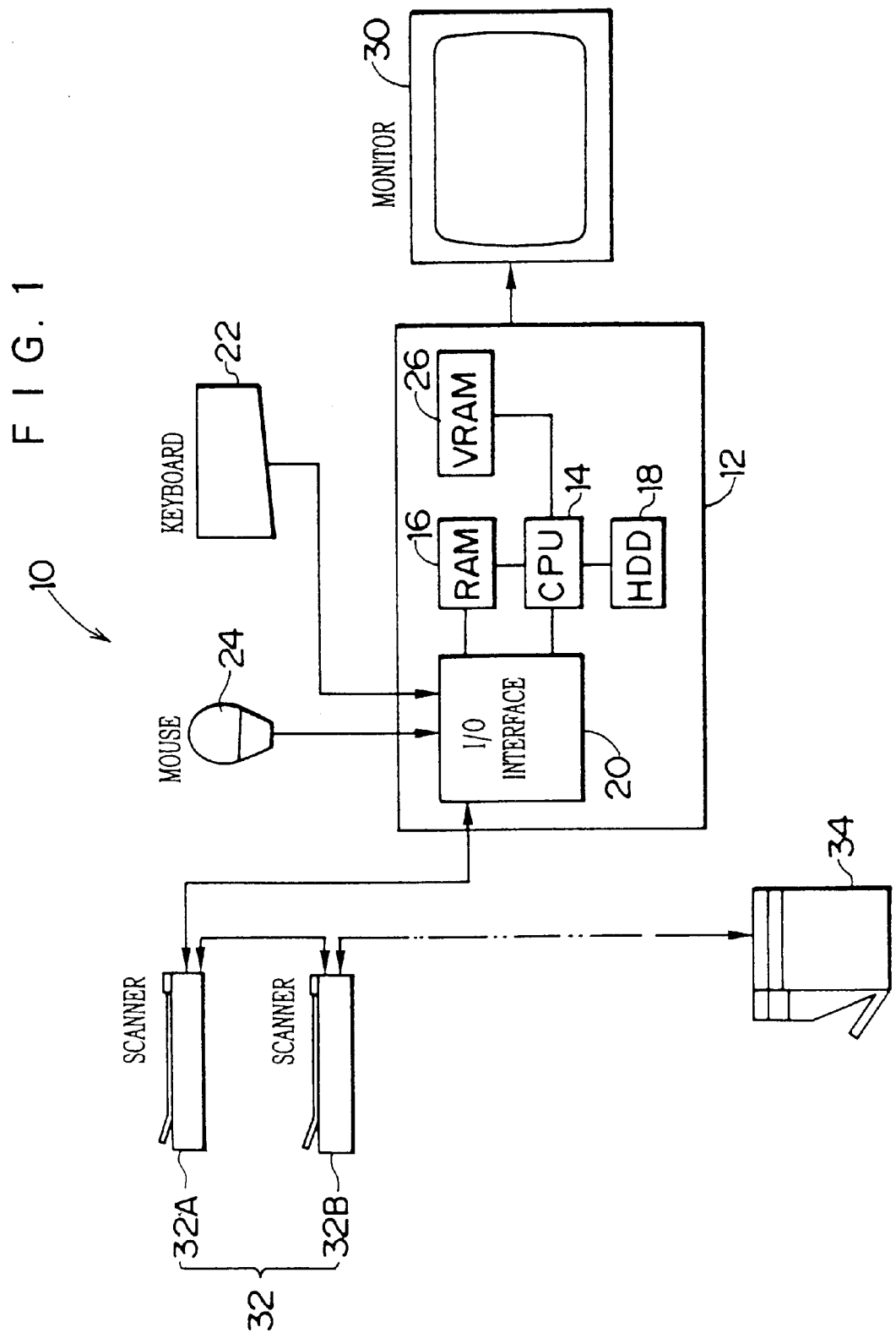
FIG. 1 is a schematic structural view of a photographic image processing system applied to an embodiment of the present invention.

Referring now to the attached drawings, an embodiment of the present invention will be described. FIG. 1 shows a photographic image processing system 10 applied to the embodiment of the present invention. The photographic image processing system 10 has a personal computer 12 which performs device control, various processing and calculation, and control of various input-output equipment. The personal computer 12 is constructed in that a CPU 14 which performs calculation and various control, an unillustrated ROM in which calculation of the CPU 14 and a control program are stored, a RAM 16 having a working area, a hard disk drive (HDD) 18 in which a program for control of the input-output equipment, various data (data file), and the like are stored, an input-output interface 20, and the like are connected by unillustrated data bus and control bus.

An external operating means such as a keyboard 22, a mouse 24, and the like are connected to the input-output interface 20. Further, a VRAM 26 is provided in the personal computer 12, and various processing operations can be performed while an image based on data which has been temporarily stored in the VRAM 26 is displayed on the monitor 30.

A plurality of scanners 32A, 32B serving as an image input device (in the present embodiment, two scanners are illustrated as an example, and which will be generically hereinafter referred to as a scanner 32) are connected to the input-output interface 20, and a photographic printer 34 serving as an image output device is connected to the scanner 32. The personal computer 12 selects one of the scanners 32 to read image data, and outputs the image data to the photographic printer 34.

Meanwhile, the input-output interface 20 allows serial or parallel connection of the scanner 32 and the photographic printer 34 by using SCSI (Small Computer System Interface) or SCSI-2, and a plurality of photographic printers 34 may be connected to the input-output interfaces 20 together with the plurality of scanners 32. Further, an external storing device such as an external hard disk or the like may also be connected to the input-output interface 20.

The scanner 32 outputs image data by receiving reflected light of light illuminated on an image of a reflection original such as a photographic print or the like. Further, the scanner 32 outputs image data by receiving transmitted light (or transmitted and reflected light) of light illuminated on an image of a transmission original such as a negative film, a positive film, or the like.

Further, the photographic printer 34 prepares prints by effecting digital exposure processing for a photosensitive material such as color photographic printing papers of different sizes (which will be hereinafter referred to as "paper") in accordance with image data outputted from the personal computer 12. Meanwhile, the photographic printer 34 includes a memory in which the image data outputted from the personal computer 12 is temporarily stored, and on the basis of the data temporarily stored in this memory, prints are prepared. As this photographic printer 34, "Pictrography 3000 (trade name)" manufactured by FUJI PHOTO FILM CO., LTD. can be used.

FIG. 2 shows a functional block diagram which is mainly formed within the personal computer 12 in the photographic image processing system 10. The image data read by the scanner 32 is inputted to an image data converting portion 40. The image data converting portion 40 stores a look-up table (which will be hereinafter referred to as "LUT") 0 which is previously set for each of types of scanner 32, reads converted data from LUT0 selected in accordance with the type of scanner 32, and on the basis of the converted data, performs conversion of the image data. As a result, so long as the scanner 32 is of a type of scanner that respective color components of R, G, and B are outputted for each scanning line, when image data of one image is read, these data are converted to respective image data of R image frame, G image frame, and B image frame for each frame. Even when any type of the scanner 32 is used, the image data is outputted for each of the image frames.

The image data converted in and outputted from the image data converting portion 40 is stored, as a read image from the scanner 32, in a conversion data memory 42. An image corresponding to the image data stored in the conversion data memory 42 can be displayed on the monitor 30.

A scanner/original characteristics correcting portion 44 is provided as first correcting means and reads the image data outputted from the image data converting portion 40 or the image data stored in the conversion data memory 42. In the scanner/original characteristics correcting portion 44, LUT1, a matrix coefficient (matrix 1), and LUT2 are previously set as parameters for correction of image data.

LUT1 is a table for converting the image data read by the scanner 32 to luminance-linear signal. LUT1 compares a value read by the scanner from a plurality of filters (i.e., ND filters) having different densities and a value of luminance converted from a filter transmission density with each other, and is previously set for each of the scanners 32 (for each of types of scanners) and for each of kinds of originals (namely, in accordance with a transmission original or a reflection original, and in the case of the transmission original, a negative type or a positive type) so that the value read by the scanner coincides with the value of the filter transmission density.

The matrix coefficient, matrix 1, is used in calculation for correcting the spectral sensitivity distribution of the scanner and converting the same to a read value in Status M (transmission original) or in Status A (reflection original). When the spectral sensitivity distribution of the scanner and a spectral distribution of a film (of a negative type or a position type) which is the transmission original are known, the matrix coefficient, matrix 1, is used to obtain, by calculation, a luminance value read by the scanner from an image of the film which is an original, and a luminance value read by Status M or Status A. Further, when the spectral sensitivity distribution of the scanner or the spectral distribution of the film is not known, a film original photographed under a proper condition or a chart original prepared by proper exposure is read by the scanner or a measuring device such as a densitometer and is converted to the luminance value. The luminance value is obtained by a least squares method or the like so that the luminance value of R, G, B or the luminance value of Y, M, C when read by the scanner 32 is converted to the luminance value of R, G, B or the luminance value of Y, M, C when read by Status M or Status A.

Meanwhile, as the chart original prepared by proper exposure, a photographic print is used which is prepared by effecting analogue exposure processing for a color photographic printing paper with transmitted light of an image of the chart original in an analogue exposure system which is used for preparing a conventional photographic print from the image of the chart original recorded on, for example, a negative film.

LUT2 is a table for converting a luminance signal to a density value.

In the scanner/original characteristics correcting portion 44, data previously stored in LUT1, LUT2 and the matrix coefficient, matrix1, is read as parameters for correction of image data, the image data is corrected on the basis of the read parameter, and the image data of the transmission original and the reflection original is converted to density data e of the density signal of the same level.

The image data (density data e) outputted from the scanner/original characteristics correcting portion 44 is stored in the density data memory 46 as the image data on the monitor 30, which indicates an intermediate image.

An original/paper characteristics correcting portion 48 is provided as second correcting means and reads the image data outputted from the scanner/original characteristics correcting portion 44 or the image data stored in the density memory 46 (both are density data e).

The original/paper characteristics correcting portion 48 allows previous setting of LUT3, matrix coefficient, Matrix 2, and LUT4. LUT3 is a table which shifts, by respective filters of CMY and D (density), the original density values of R, G, B or C, M, Y which is the image data inputted from the scanner/original characteristics correcting portion 44, and is previously set and stored in accordance with the kind of original.

The matrix coefficient, matrix 2, is a coefficient used when matrix calculation of 3×3 is performed to convert the density of an original of R, G, B or C, M, Y to an amount of exposure on a paper. The matrix coefficient, matrix 2, is obtained by calculation from the spectral distribution of an original, for example, a film, and the spectral distribution of a paper on which an image is exposed by the photographic printer 34, and is previously stored in accordance with a combination of the kind of original and the kind of photosensitive material.

LUT4 is a table which converts an amount of exposure on a paper to a print density on the paper and sensitometry data of the paper is set in a table. Meanwhile, when there is no data for calculating the matrix coefficient, matrix 2, and LUT4, by using the density value of R, G, B or C, M, Y, read by a measuring device such as a densitometer from a film original on which a chart image is recorded by photographing with proper exposure, and the print density value of each of three colors of C, M, Y measured from a photographic print on which the film original is printed by analogue exposure processing under a standard condition, the matrix coefficient, matrix 2, and LUT4 can be set by calculation so that the density value of R, G, B or C, M, Y is converted to the print density values of C, M, Y on the color paper.

As described above, since the original/paper characteristics correcting portion 48 uses, as parameters, the data selected from LUT3, LUT4 and the matrix coefficient, matrix 12 in accordance with the kind of original and the kind of photosensitive material, and corrects the image data outputted from the scanner/original characteristics correcting portion 44 in accordance with respective characteristics of the original and the paper, there data is outputted as the image data (i.e., print density data f) which can set the print density at a fixed value irrespective of the kind of photosensitive material.

The image data outputted from the original/paper characteristics correcting portion 48 (i.e., print density data f) is inputted to a paper/monitor characteristics correcting portion 50.

The paper/monitor characteristics correcting portion 50 is provided as data generating means for monitor display. LUT5, the matrix coefficient, matrix 3, and LUT 6 are previously stored in the paper/monitor characteristics correcting portion 50, and the image data inputted as the print density data f is converted to an RGB monitor signal (RGB monitor data g) for proper display on the monitor 30. Here, the converted RGB monitor data g is converted so that the gradation and color tone of the print, obtained when the print is prepared with the paper being exposed by the photographic printer 34 on the basis of the print density data f, coincides with appearances of gradation and color tone displayed on the monitor 30.

Here, it is necessary to cause the print density values of three colors of C, M, Y of the image printed onto the paper and the measured values (X, Y, Z and LAB, and the like) to correspond to each other. Namely, by obtaining correspondence of these values from respective spectral distributions of a color material and a base of the paper and a color function (x, y, z), or by actually measuring a luminance value at the time when the image of the chart original is displayed on the monitor 30 and a density value of a photographic print in which the chart original is printed under a standard condition, it is possible to cause the image printed onto the color paper in accordance with the image data and the image displayed on the monitor 30 to correspond to each other.

Further, when an image corresponding to image data is displayed on the monitor 30, it is necessary to cause a colorimetric value on the color paper and a calorimetric value on the monitor 30 to correspond to each other. When the image corresponding to the image data is displayed on the monitor 30, there is a possibility that a desired color is not reproduced on the monitor 30 depending upon a color reproduction region, namely, due to color compression, color spreading, or the like. In order to eliminate this problem, it is necessary to cause the calorimetric value on the color paper and the colorimetric value on the monitor 30 to correspond to each other.

Thus, in order to obtain by calculation the correlation between the color reproduced on the color paper and the color reproduced on the monitor 30, the calorimetric value on the color paper and the calorimetric value on the monitor 30 are caused to correspond to each other by using a chromatic-adaptation predictive value and the color which cannot be reproduced on the monitor 30 is caused to correspond to a color within a color reproduction region of the monitor 30 in which color difference becomes minimum. Further, when the above correlation is obtained by actual measurement, a photographic print obtained with the chart original being printed by analogue exposure (i.e., analogue exposure) under a standard condition is used, the print of the chart original and the image displayed on the monitor 30 are compared with each other, and the color on the monitor 30 is determined so that the print and the image are viewed as the same color.

Further, it is necessary to cause the calorimetric value of the image on the monitor 30 to correspond to an RGB monitor signal. This can be obtained by calculation from the characteristics of the monitor 30 such as a y value, color temperature, fluorescence chromaticity, and the like.

When LUT5, LUT6 and the matrix coefficient, matrix 3, are previously set by taking account of the above-described three points, it is possible to convert image data to the RGB monitor data g corresponding to the print densities of C, M, Y on the paper of an image based on the print density data f. LUT5 and LUT6 are tables which are respectively prepared to perform conversion from the density to the luminance and conversion from the luminance to the RGB monitor signal. The matrix coefficient, matrix 3, is determined so that the print luminance value of C, M, Y on the paper is converted to the luminance value of R, G, B on the monitor 30.

The print density data f is converted to the RGB monitor data g in the paper/monitor characteristics correcting portion 50, and is stored, as a display image, in a monitor data memory 52. The display image on the monitor 30 based on the image data (RGB monitor data) stored in the monitor data memory 52 has the same color tone, gradation, and the like as those of an image printed on the paper in accordance with the print density data f. As a result, it is possible to exactly predict, on the monitor 30, the image of the print prepared, by the photographic printer 34, from the image read by the scanner 32.

The output from the paper/monitor characteristics correcting portion 50 or the RGB monitor data g in the monitor data memory 52 are transferred, as the image data of the original read by the scanner 32, to a data transfer portion 54. The personal computer 12 allows various processing in which the RGB monitor data g is used as the image data of the original read by the scanner 32 (i.e., processing by various software for image processing such as photo-retouching software or the like). At this time, it is possible to effect the above processing while exactly predicting, on the monitor 30, a finished state of an image at the time when a print is outputted by the photographic printer 34.

Meanwhile, the processing in which the image data of the original read from the scanner 32 is outputted as the RGB monitor data g is performed by an image input program (which will be hereinafter referred to as "input module").

The input module provided in the personal computer 12 allows setting of three modes: first scan having a low resolution and reading only image data of any one of three colors of R, G, and B; pre-scan having a low resolution and reading a color image; and fine scan reading a color image of a high resolution within a capability range of the scanner 32.

This input module executes the first scan after setting the type of scanner and the kind of original (namely, a reflection original or a transmission original). The first scan allows storing of image data of only one color, for example, the color of R, in the conversion data memory 42.

Next, a read image corresponding to the image data stored in the conversion data memory 42 is displayed on the monitor 30 and detailed setting of the kind of original, setting of a reading region of an image read from an original, and the like are performed. As a result, the input module allows selection of the parameters for data conversion, from LUT1, LUT2 and the matrix coefficient, matrix 1.

Here, when the pre-scan is executed, a color image of low resolution is read, the image data is corrected on the basis of the parameters selected in the scanner/original characteristics correcting portion 44, and the corrected image data is stored, as the density data e, in the density data memory 46.

Next, an image based on the density data e stored in the density data memory 46 is displayed on the monitor and the kind of photosensitive material exposed by the photographic printer 34, or the like is set. As a result, the parameters corresponding to the kind of original, the kind of photosensitive material, and the monitor 30 are selected from LUT 3 through LUT 6, and the matrix coefficients, matrix 2 and matrix 3.

Subsequently, the density data stored in the density data memory 46 on the basis of the selected parameters is read in the original/paper characteristics correcting portion 48 and is converted to the print density data f, and further converted to the RGB monitor data g in the paper/monitor characteristics correcting portion 50. Meanwhile, since the image data read from the reflection original such as a photographic print or the like is the print density data f, only color adjustment is performed. Further, the image data read from the scanner 32 by the pre-scan is stored, as temporary image data such as read image data, intermediate image data, display image data, or the like, in the conversion data memory 42, the density data memory 46 and the monitor data memory 52.

Namely, the image data outputted from the image data converting portion 40 is inputted to the scanner/original characteristics correcting portion 44. The scanner/original characteristics correcting portion 44 outputs density data e converted to Status M density value or Status A density value. As a result, the subsequent image processing operations allows processing in which image data is used which does not depend upon the type of scanner. The density data e is stored in the density data memory 46 and is displayed, as the intermediate image, on the monitor 30.

The density data e is corrected so as to have proper gradation and color tone on a paper by considering the characteristic of the original and the characteristic of the paper when the paper is exposed in accordance with the image data on the basis of LUT3, matrix coefficient, matrix 2, and LUT 4 which have been read in the original/paper characteristics correcting portion 48 and previously set. The corrected density data is outputted to the paper/monitor characteristics correcting portion 50 as the image data corresponding to the print density (i.e., the print density data f).

Thus, in the original/paper characteristics correcting portion 48, the print density data is obtained which allows an image of an original to be printed in an image quality which is equal to that at the time of printing using the analogue exposure system. Accordingly, differences in grade (soft gradation, medium gradation, hard gradation, hardest gradation, ultra-hard gradation), photographic sensitivity, contrast, fog, color sensitivity, image quality (granularity, resolution, sharpness, MTF), and the like, which cannot be conventionally obtained when the image recorded on the negative film is printed by the digital exposure processing, can be reproduced by the digital exposure processing.

The paper/monitor characteristics correcting portion 50 converts an image corresponding to an image corresponding to the print density data f to image data for display on the monitor 30 (i.e., RGB monitor data g) by considering the spectral characteristics of the paper and the color reproduction characteristics of the monitor 30 on the basis of LUT5, matrix coefficient, matrix 3, and LUT6, which have been previously set. The RGB monitor data g outputted from the paper/monitor characteristics correcting portion 50 is stored in the display image memory 52 and is displayed, as a display image, on the monitor 30.

In this way, the input module prepares the density data e corresponding to, the image of the original read from the scanner 32, and performs auto-setup operation for automatically converting the density data e to the RGB monitor data g.

Subsequently, when the fine scan is indicated, the image data is read from the scanner 32 at a high resolution (which is the resolution of the scanner 32 at the maximum of its capability), the image data is corrected on the basis of the set parameters, and the corrected image data is converted to image data, i.e., RGB monitor data g, and then outputted to the data transferring portion 54. Meanwhile, the image data read by the pre-scan may also be outputted, as the RGB monitor data g, to the data transferring portion 54.

Thus, in the input module, the scan modes have different scan times, data sizes, image processing times, and the like. After the image reading region is set by the first scan of which data size and image processing time are set minimum, by effecting various processing for the image data read by the pre-scan of which scan time, data size and image processing time are set to be relatively small, and by setting various parameters for performing the final fine scan, an operating time for reading the image data can be reduced.

On the other hand, the photographic image processing system 10 is provided with a data take-in portion 56 in which the image data outputted to the photographic printer 34 is inputted. The inputted image data is outputted from the data take-in portion 56 to the photographic printer 34 via a print data converting portion 58. Meanwhile, the print data converting portion 58 may also be provided in the photographic printer 34.

The data take-in portion 56 operates in accordance with an output processing program (which will be hereinafter referred to as "output module") set in the personal computer 12. When, by operating the keyboard 22 and the mouse 24 with the image corresponding to the image data (i.e., RGB monitor data g) being displayed on the monitor 30, printing conditions such as magnification are set together with the print size and the number of prints when prints are outputted from the photographic printer 34, automatic layout of the image at the time of printing is effected.

The print data converting portion 58 performs correction which is the reverse of the correction in the paper/monitor characteristics correcting portion 50. Namely, the paper/monitor characteristics correcting portion 50 converts the print density data f to the RGB monitor data g, and outputs the converted data, and the data take-in portion 56 processes the RGB monitor data g as the image data. The print data converting portion 58 performs conversion and inverse conversion using LUT5, LUT6, and the matrix coefficient, matrix 3, and outputs the print density data f from the RGB monitor data g.

An example of a concrete image processing operation performed by the photographic image processing system 10 applied to the embodiment of the present invention will be hereinafter described in detail with reference to the attached drawings. It should be noted that the following description and indications used therein are shown as an example and the construction of the present invention is not limited thereto.

The photographic image processing system 10 is constructed in that, when a connecting equipment such as the scanner 32 and the like is activated together with the personal computer 12 and the input module is initiated, an input setting menu is displayed on the monitor 30.

Figure 3:
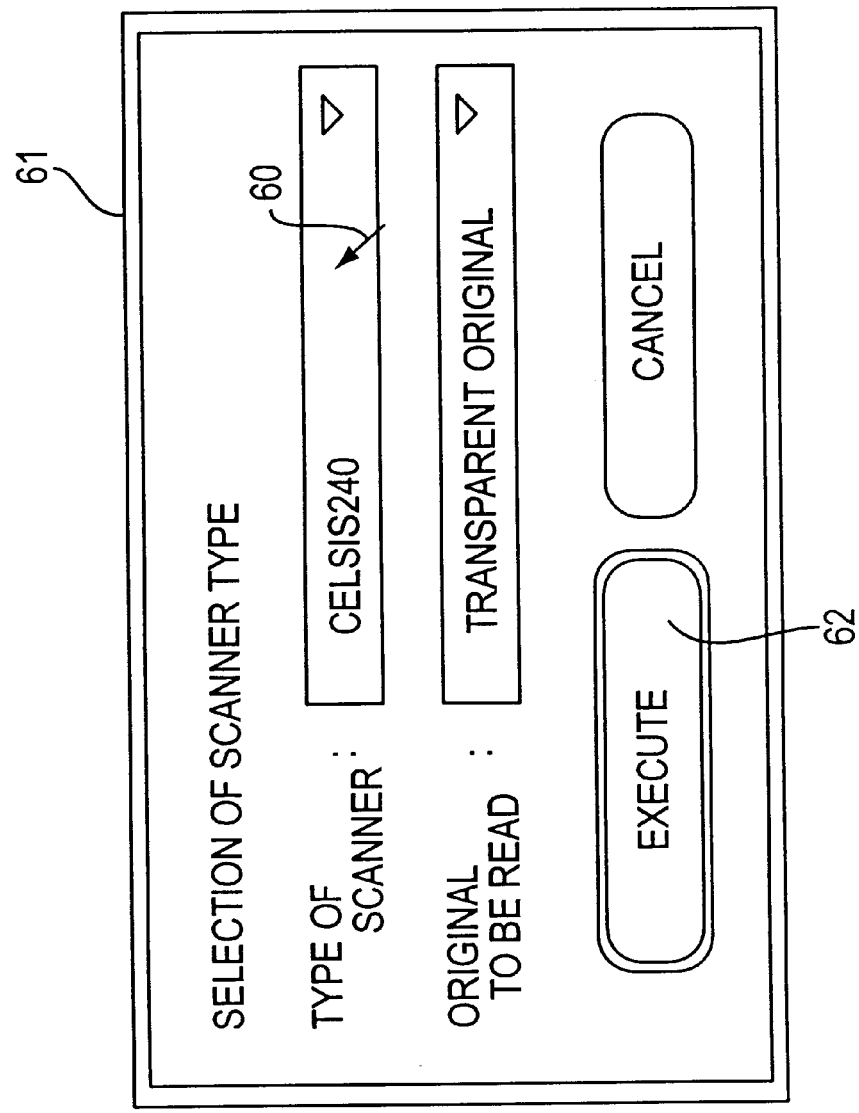
FIG. 3 is a schematic diagram showing an example of a set screen displayed on a monitor when input processing is effected.

FIG. 3 shows an example of an input setting menu (dialogue box) 61 to be displayed on the monitor 30. The input setting menu allows setting of the type of scanner and the kind of original. For example, in a case in which the type of scanner is selected, when a cursor 60 is moved to an item for setting the type of scanner by operating the mouse 24 or the like and the mouse 24 is clicked to designate the item (which will be hereinafter referred to as "click operation"), a pop up menu (not shown) is opened, and names of the types of scanners which have been previously registered, as the scanner 32, in the personal computer 12 are displayed on the menu. The display of the names of scanners allows selection of the scanner 32 used for image input processing. Further, in the case of an original on which an image is recorded, the kind of original is displayed in the form of the pop up menu by a click operation of the object original setting item 62. The setting of the kind of original provides a selection of a reflection original such as a photographic print, or a transmission original such as a negative film, positive film, or the like.

When the type of scanner and the kind of object original are selected and a click operation of an execution button 62 is effected, the selected types of scanner and original are set. Meanwhile, so long as a scanner control program parameter, information of authorization/prohibition of a combination of the kind of original and the kind of paper, and image processing parameters are stored, and the type of scanner, the kind of original, and the kind of paper, which can be selected for each of the image processing parameters are set and stored, for example, when the type of scanner and the kind of original are selected, a combination with an applicable kind of paper or a non-applicable kind of paper can be made clear. Further, by storing respective data in previously-designated files, maintenance such as alteration, updating and deletion of data, or the like is facilitated.

Figure 4:
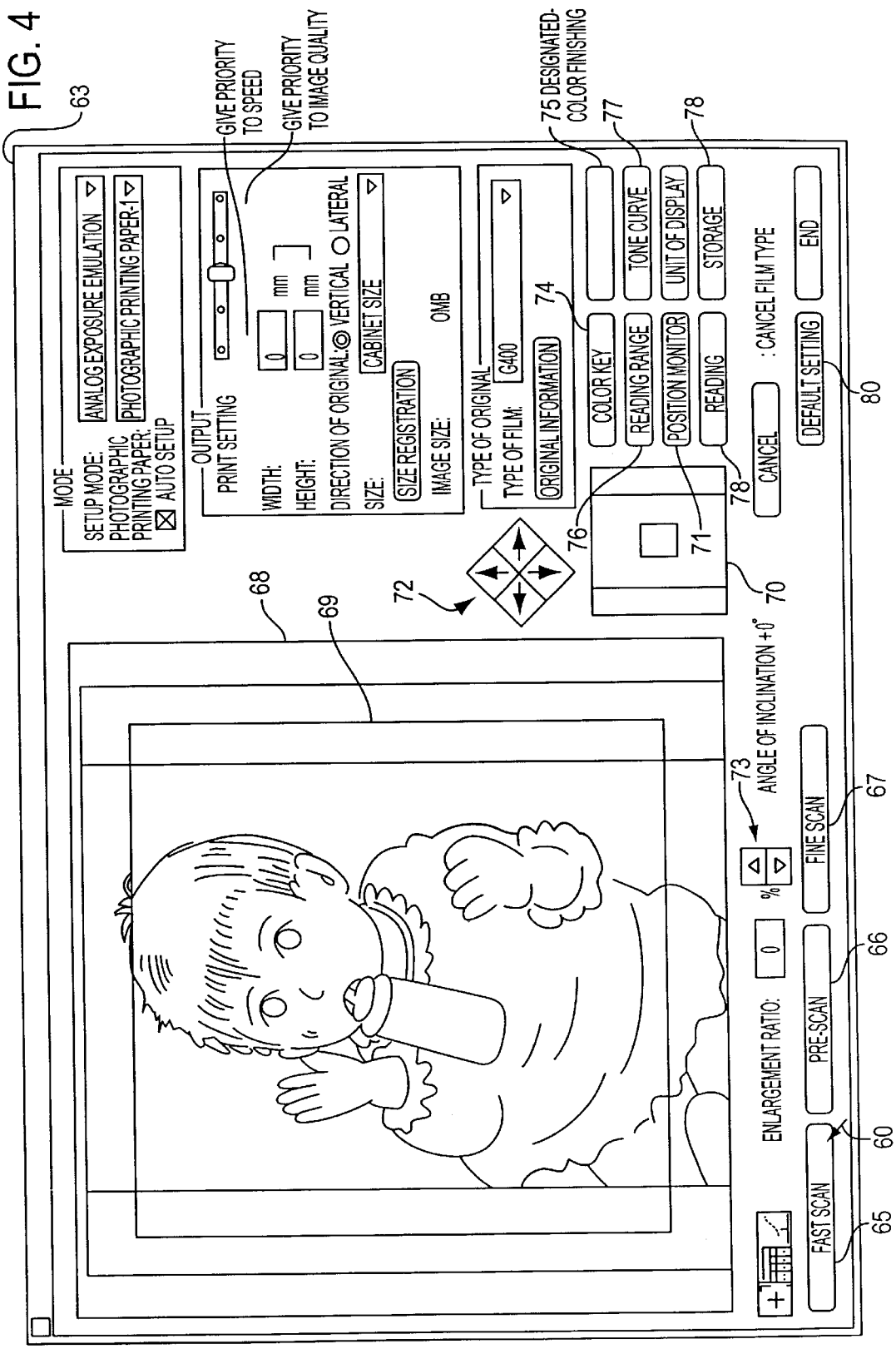
FIG. 4 is a schematic diagram showing an example of a main menu displayed on a monitor when input processing is effected.

When setting of the type of scanner and the kind of original is terminated, the display of the monitor 30 is switched to a main menu shown in FIG. 4. A first scan button 65, a pre-scan button 66, and a fine scan button 67 are displayed on the main menu 63. The click operation of the first scan button 65 allows reading of an image from the selected scanner 32 at a low resolution.

Thus, the image data of a single color corresponding to the image of the original is read from the scanner 32, and in the image data converting portion 40, the image data is read in accordance with data set in LUT0, and then, the image data thus read is stored in the conversion data memory 42.

The image data stored in the conversion data memory 42 is displayed, as a monotone image, in an image display area 68 of the main menu 63. At this time, the image display area 68 allows display of all of an image reading region of the scanner 32, and the image of the original is displayed at a position corresponding to an original-placed position on the scanner 32. At the same time, an output frame 69 is displayed in the image display area 68. Meanwhile, the main menu 63 is provided with a position monitor display area 70 and a position monitor button 71. By effecting the click operation of the position monitor button 71, a position of an original for an image reading region of the scanner 32 and a position of the output frame 69 are displayed in the position monitor display area 70.

The display position of an image displayed in the image display area 68 moves with respect to the output frame 69 by the operation of a frame moving button 72. By setting a magnification of the image from the operation of a magnification setting button 73 or from the key operation of the keyboard 22, the output frame 69 displayed in the image display area 68 is enlarged and reduced. This operation allows setting of an image region to be read as the image data.

Meanwhile, the main menu 63 allows setting of the kind of photosensitive material when an image of an original is exposed by the photographic printer 34, setting of an analogue exposure emulation or a digital mode emulation, setting of prints with a printing speed or an image quality being regarded as important, and output setting such as setting of an output size. As a result, setting of the magnification of the image within the output frame 69, and selection of LUT 1 through LUT 6 and the matrix coefficients, matrix 1 through matrix 3, which are used in processing of read image data, i.e., setting of the parameters for correcting the image data, are performed.

When the analogue exposure processing (analogue exposure processing) is effected in accordance with an image recorded on a photographic film such as a negative film, the print gradation becomes a fixed gradation which is determined from a characteristic value of the photographic film and a characteristic value of the paper. In the analogue exposure emulation mode, the print gradation becomes a fixed gradation which is determined from the characteristics of the original and the characteristics of the paper. Further, in the digital image mode, the print gradation is obtained by an auto-setup calculation so that the print is most suitably finished in accordance with a scene of an image recorded on the original, namely, the image of the original is underexposed or overexposed, the original is that photographed in the daytime or in the nighttime, or the like.

Further, the main menu 63 allows detailed setting of the kind of original. The setting of the kind of original means setting of a film which is of a negative type (negative film) or of a positive type (positive film) in the case of transmission original, and also allows setting of a product number in order to clarify the characteristics of the original. The setting of the product number allows opening of previously-registered product numbers by the pop up menu and selection of any one therefrom.

After these various setting operations are completed, by effecting the click operation of the pre-scan button 66, the pre-scan operation is effected. When the image of the original is read by the pre-scan operation, the image data is converted in order from the image frames of R, G, B, and is inputted to the scanner/original characteristics correcting portion 44. In the scanner/original characteristics correcting portion 44, since each type of scanner and original is set, the parameters are selected from LUT1, LUT2 and the matrix coefficient, matrix 1 and scanner correction for the image data is performed, and then, the corrected data is stored, as the density data e, in the density data memory 46.

In the image display area 68 of the main menu, the image based on the density data stored in the density data memory 46 is displayed as an intermediate image.

The main menu 63 allows display of a color key button 74 for effecting color control, a designated-color finishing button 75, a reading range button 76, a tone curve button 77, and the like. By operating these buttons, setting and alteration of parameters when the density data e is converted to the print density data f and the RGB monitor data g is performed.

Respective set values can be stored in a data file in HDD 18 by the click operation of a storing button 78 and set values stored by a reading button 79 can be read out. Further, the operation of a default setting button 80 allows selection of the parameters from LUT 3 through LUT 6 and the matrix coefficients, matrix 2 and matrix 3, in accordance with previously-set fixed values, i.e., the type of scanner, the kind of original, and the kind of photosensitive material. The auto-setup operation is performed in the original/paper characteristics correcting portion 48 and in the paper/monitor characteristics correcting portion 50.

Figure 5:
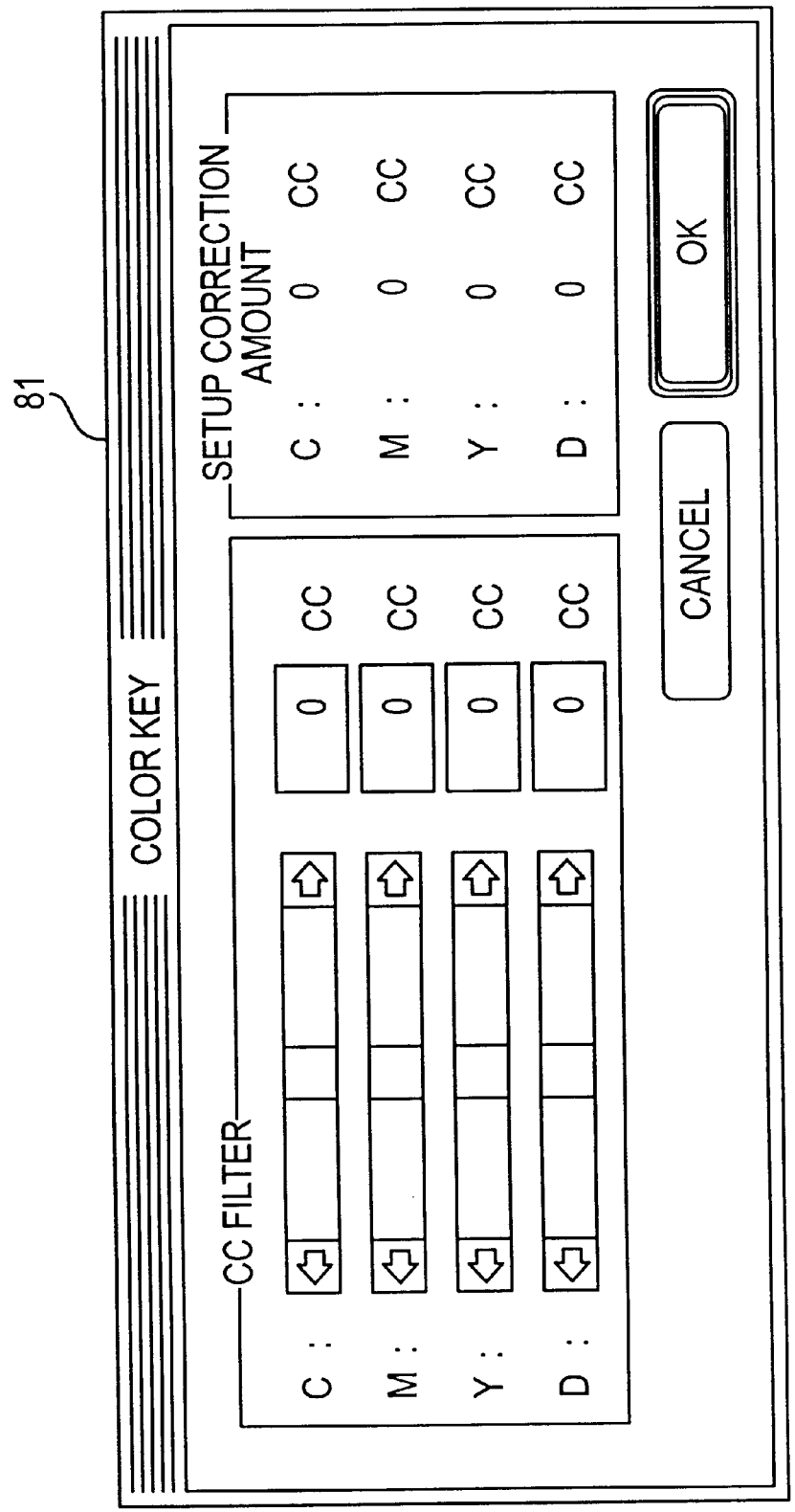
FIG. 5 is a schematic diagram showing an example of a display when a color-key setting operation is effected.

When the color key button 74 is operated, a color key menu 81 shown in FIG. 5 is displayed on the monitor 30. The color key menu 81 is formed by emulation of color adjustment by color filters of C, M, Y in the analogue exposure system (corresponding to a CC filter) and by correction of an exposure amount (density). Each ratio (%) of C, M, Y and D can be set by key input operation or the like.

Figure 6:
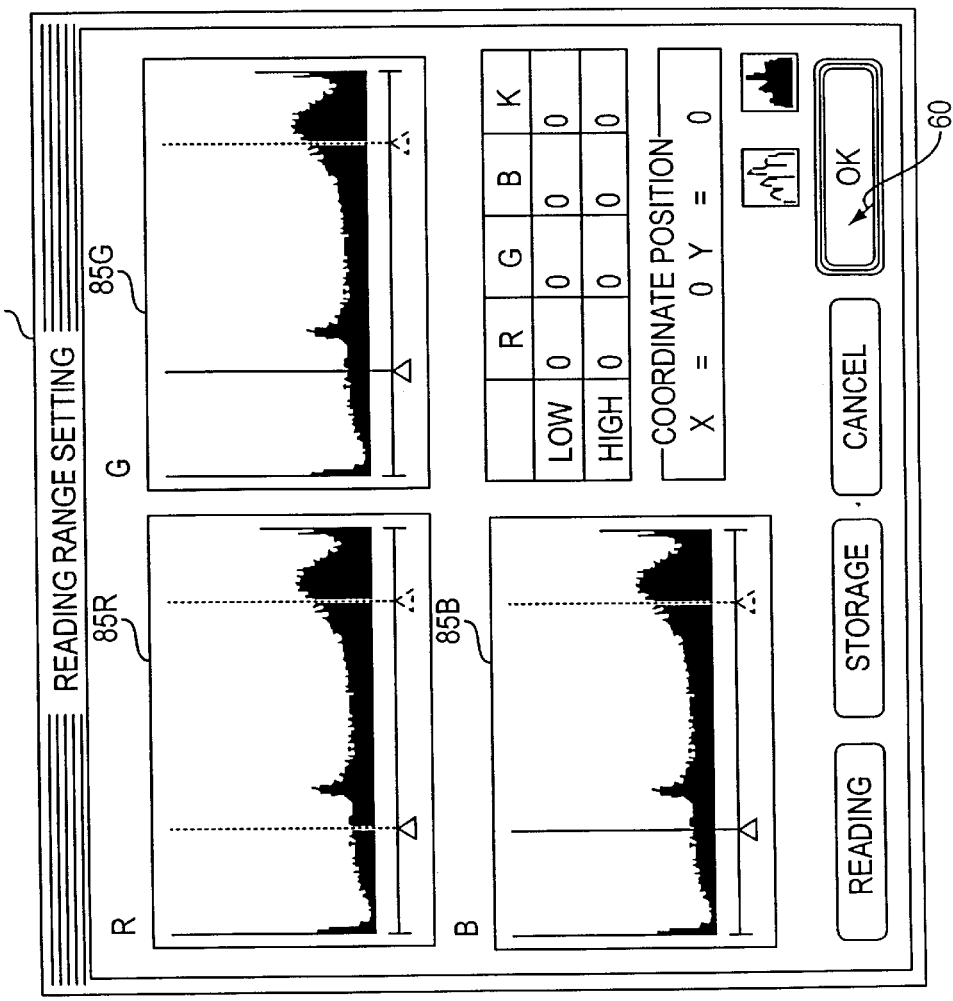
FIG. 6 is a schematic diagram showing an example of a display when a read-range setting operation is effected.

Further, when the reading range setting button 76 is operated, a reading range setting menu 82 shown in FIG. 6 is displayed on the monitor 30. The reading range setting menu 82 allows allocation of a density range on the original into highlight/shadow areas at the time of printing. Namely, the density of the original is displayed in histograms 85R, 85G, 85B of R, G, B, and when highlight/shadow points are specified in these histograms 85R, 85G, 85B, or when the density value is inputted by the key operation, or when the image is displayed by the pre-scan operation, a point on the display image can be specified to be set.

Setting of the color key and the reading range is used so that an amount of exposure and an exposure time are reflected on a print density signal at the next time of image reading, or used so as to alter the amount of exposure and the exposure time at the time of reading images by the scanner 32.

Figure 7:
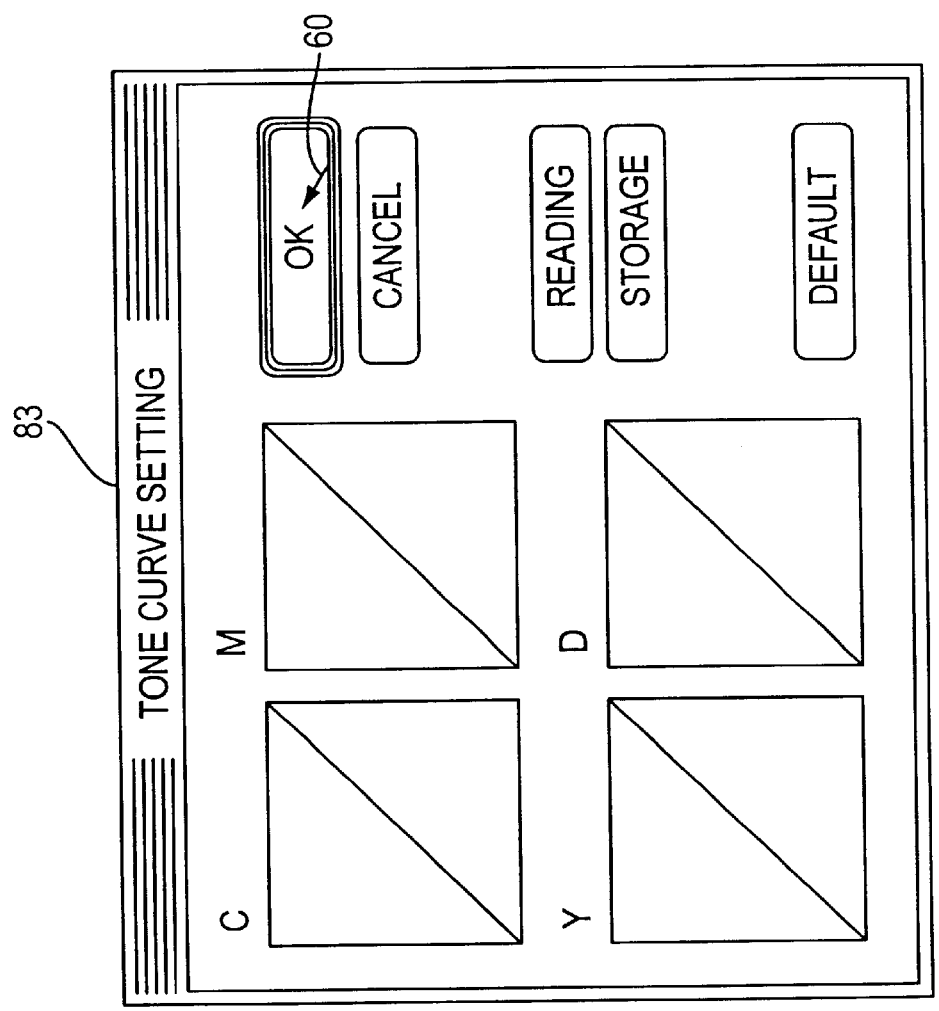
FIG. 7 is a schematic diagram showing an example of a display when a tone-curve setting operation is effected.

When the tone curve button 77 is operated, a tone curve setting menu 83 shown in FIG. 7 is displayed on the monitor 30. The tone curve setting menu 83 allows setting of any one of an analogue exposure emulation mode and a digital image mode and allows selection and setting of change in gradation for each of Y, M, C, and D (density). The tone curve setting is performed by cascading a default value set by the setup mode for each of three colors of C, M, Y.

Figure 8:
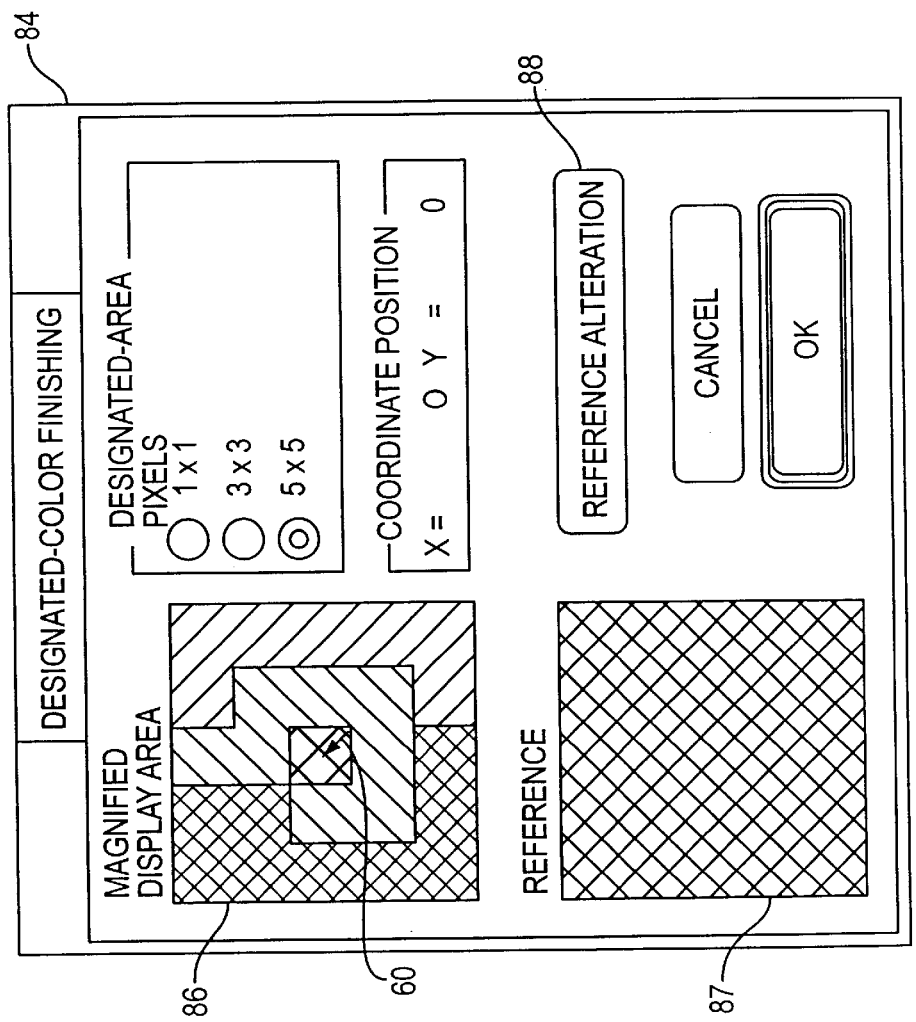
FIG. 8 is a schematic diagram showing an example of a display when a designated-color finishing operation is effected.

Further, when the designated-color finishing button 75 is operated, a designated-color finishing menu 84 shown in FIG. 8 is displayed on the monitor 30. The designated-color finishing menu 84 is effective only when the image inputted by the pre-scan operation is displayed on the monitor 30. In the designated-color finishing menu 84, and an enlargement display area 86 allows enlarged display of arbitrary points (for example, 5×5=25 dots) of the image displayed in the image display area 68 of the main menu 63, and a reference area 87 allows display of a reference image (gray image: reference gray). Here, by effecting a click operation with the cursor 60 being positioned at an arbitrary pixel displayed in the enlargement display area 86, the color of a corresponding pixel is made coincident with the reference gray, and synchronously, colors of other pixels are shifted. The reference gray allows alternation in gradation by operating a reference alteration button 88. As a result, adjustment of gray balance can be effected rapidly and easily.

Thus, when various setting operations are effected for the intermediate image, the parameters of the original/paper characteristics correcting portion 48 and the paper/monitor characteristics correcting portion 50 are set. The density data e stored in the density data memory 46 on the basis of the above setting operations can be converted to the print density data f and the RGB monitor data g. The RGB monitor data g is stored in the monitor data memory 52 and is also displayed in the image display area 68 of the main menu on the monitor 30.

The image displayed in the image display area 86 in a manner as described above has a color tone and gradation which are coincident with those of a print obtained by exposing a paper by the photographic printer 34 by considering the characteristics of the original and the paper, and the characteristics of the paper and the monitor 30. Namely, the image printed on the paper on the basis of the print density data f can be exactly represented from the image displayed on the monitor 30 by using the RGB monitor data.

Thus, after confirmation of a finish state of the image data read as the RGB monitor data g to be read as image data has been completed on the basis of the image read by the pre-scan operation, when the fine scan button 67 is operated, the image data corresponding to the image of the original is taken in from the scanner 32 at a high resolution, the take-in image data is corrected in accordance with the set various parameters, and the corrected image data is outputted, as the RGB monitor data g, to the data converting portion 54.

Thus, after various setting operations are effected for the image data read at a low resolution and the image is confirmed, the image data is read at a high resolution and corrected under the previously-set correcting condition, and the corrected image data is stored in the monitor data memory 52. In this way, operations from the setting process of processing conditions to the confirming process can be performed in a short time.

On the other hand, the image data read, as the RGB monitor data g, by the input module is outputted from the data converting portion 54 to the photographic printer 34, or is processed by various application software and outputted to the photographic printer 34. When a photographic print is prepared from the image data (RGB monitor data), the output module is activated. The output module can be activated individually, and when a print processing operation is selected from other application, the output module is activated.

Figure 9A:
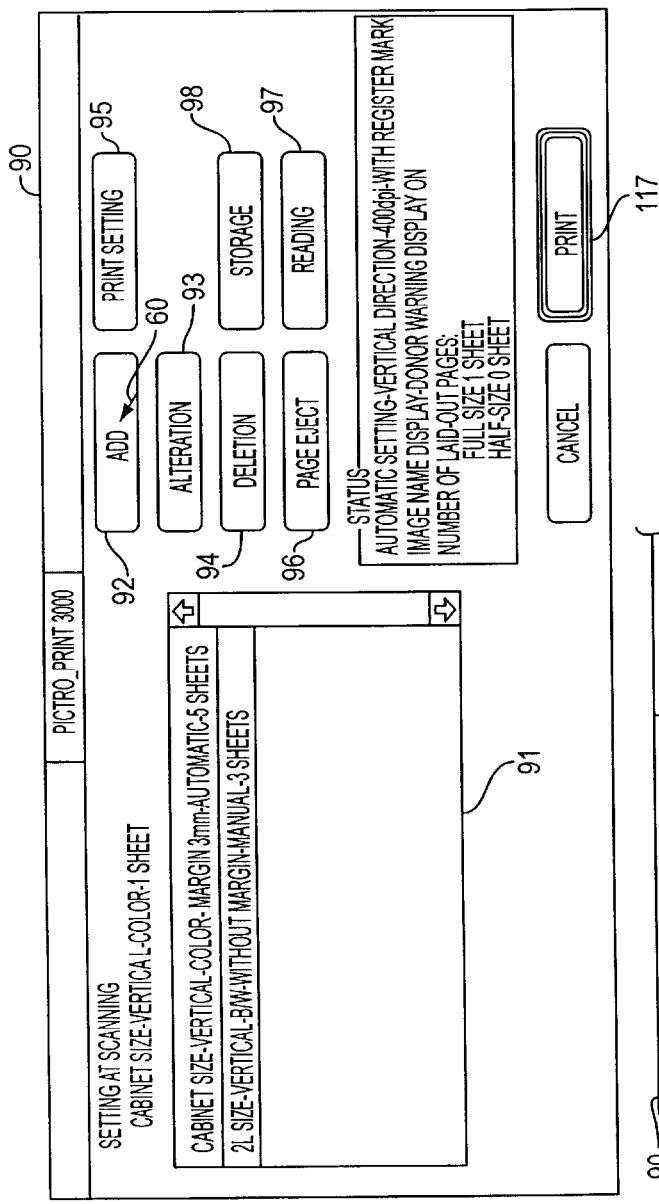
FIG. 9A is a schematic diagram showing an example of a main menu displayed at the time of an output operation.

When the output module is activated, a main menu 90 for output processing is displayed on the monitor 30. FIG. 9A shows an example of the main menu 90 for outputting processing. The main menu 90 allows display of various setting conditions such as output size, output direction (a direction in which an image faces with respect to a conveying direction of a photosensitive material in the photographic printer 34), color information, number of prints, and the like.

In the output module, when the output size is set, an actual size at the time of printing is calculated from the size and resolution of the image data, a size which is coincident with the actual size is retrieved from previously-registered sizes of photosensitive materials (a regular size), and the size is displayed as the output size. At this time, when there is no size which is coincident with the actual size in the regular sizes, the actual size is treated as a custom size (a free size is specified). Further, the color information indicates a color image or a monochromatic image (B/W), and the number of prints allows setting of "1" as a default value. These information is displayed in a print registration display area 91 of the main menu 90. Meanwhile, the print registration display area 91 also allows display of border information (a white border is provided or not in a circumferential portion of the image at the time of printing) and trimming information (trimming is performed automatically or manually when the size of the image and the set print size are not coincident with each other).

The main menu 90 is provided with an additional button 92 for adding a print instruction, an alteration button 93 of a previously registered print instruction (displayed in the print registration display area 91), a deletion button 94, a print setting button 95, a page eject button 96, a read button 97 for reading a stored setting value, a storage button 98 for storing the setting value in a predetermined file, and the like.

Here, when the click operation of the additional button is effected, a dialogue box 100 for setting trimming shown in FIG. 10 is displayed on the monitor 30. In an output frame 101 of the dialogue box 100, an image corresponding to the image data is displayed as a monochromatic image. Meanwhile, display of a monochromatic image enables rapid processing of images, and a color image may also be displayed.

Further, the dialogue box 100 allows setting of a print size, color tone, a white border, number of prints, and the like. In the respective indicating sections of these setting, previously stored setting values are displayed. The output frame 101 is displayed in such a manner that a longitudinal direction of a print is fixed at an aspect ratio corresponding to a set print size, and an image is displayed in accordance with a set enlargement ratio.

Figure 11A:
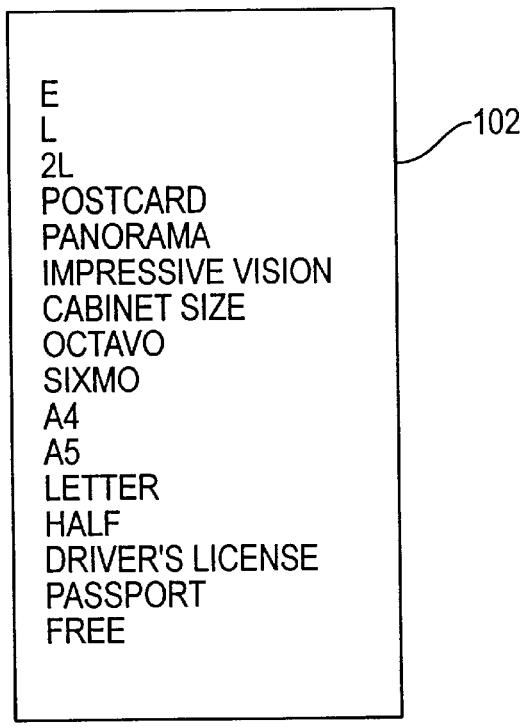
FIG. 11A is a schematic diagram showing an example of a display for size setting.
Figure 11B:
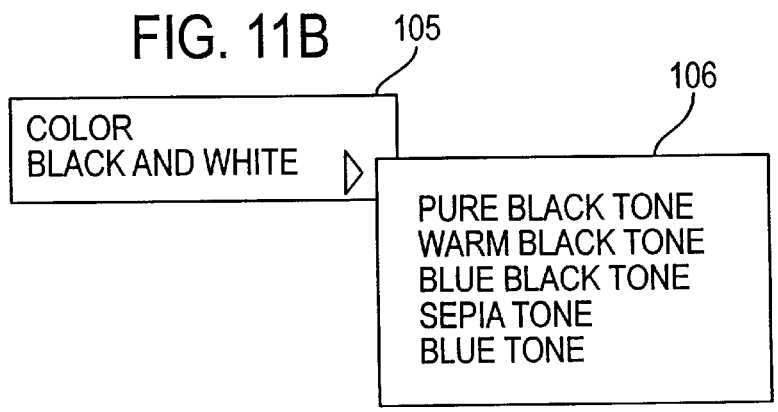
FIG. 11B is a schematic diagram showing an example of a display for color-tone setting.
Figure 11C:
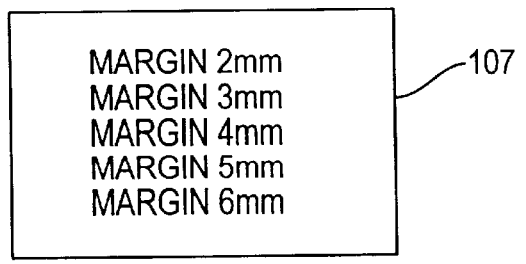
FIG. 11C is a schematic diagram showing an example of a display at the time of a white-border setting operation.

The size, color tone and white border can be respectively selected from items displayed by a pull-down menu. FIGS. 11A, 11B and 11C each show an example of pull-down menu. As shown in a regular size menu 102 of FIG. 11A, various regular sizes are displayed as the print size. When any one of these regular sizes is selected, the dialogue box 100 shown in FIG. 10 allows display of actual dimensions of "width" and "height" of the selected size.

Further, a check button 103 or a check button 104 of the dialogue box 100 shown in FIG. 10 allows setting of whether the image is printed vertically or horizontally. Further, by selecting "custom (free)" for other sizes than the registered regular sizes, the actual dimensions of "width" and "height" can be set arbitrarily.

As shown in a color tone menu 105 of FIG. 11B, if "white/black" (monochrome: B/W) is selected, then the pull-down menu 106 is displayed and a detailed tone can be selected. When any one of these tones is selected, a monochromatic image having a gray balance and a gradation corresponding to the selected tone can be printed. As a result, it is possible to prevent poor results in a finishing state of a print, such as roughness of gradation exhibited when a color image is converted to a monochromatic image, occurrence of gray balance biasing, and the like.

Further, as shown in FIG. 11C, a pull-down menu 107 of a white border allows display of a width of a border and a desired size can be selected from the displayed border widths.

The dialogue box 100 shown in FIG. 10 allows display of the set print size, color tone, and the white border, and also allows display of the number of prints. The display of the number of prints allows setting of the number to be printed at the same setting value. The number of prints is set in such a manner as to increase or decrease a numerical value by the click operation of a double-headed arrow button 108, or to effect a key operation of the numerical value.

Further, within a trimming frame 109, there are displayed a control button 110 for specifying a trimming range and an arrow button 111 for setting an enlargement ratio. The click operation of an arrow of the control button 110 allows movement of an image displayed in the output frame 101 in upper, lower, left and right directions. Further, the enlargement ratio may be set by directly inputting a numerical value and may also be increased and decreased by the arrow button 111. Thus, trimming is manually effected, an image of which enlargement ratio is changed is displayed in the output frame 101, and a range to be printed may be made coincident with the output frame 101.

On the other hand, the output module allows automatic trimming. In the case of automatic trimming, if the size of the image data and the print size are made coincident, it is set such that an entire image range is printed. However, if the size of the image data and the print size are not made coincident, it is set such that the image data is automatically enlarged and reduced within a range of the image in the output frame 101 and a central portion of the image within the output frame 101 is printed. Meanwhile, by effecting the click operation of a reset button 112 displayed in a trimming frame 109, manual trimming is canceled and automatic trimming is effected. This makes it possible to achieve efficiency of the trimming operation.

By effecting various setting operations automatically or manually as described above, in the print registration display area 91 of the dialogue box 100 shown in FIG. 10, alteration of display is made in accordance with alteration of setting. Meanwhile, by selecting a print item displayed in the print registration display area 91 of the main menu 90 and operating the alteration button 93, alteration of setting for only corresponding item can be made in the same way as in the above-described additional processing operation.

Further, a plurality of images having different conditions such as the size, color tone, gradation, presence or absence of a white border, and the like, are designated on the basis of one image data so as to be printed, and efficiency of a print operation can be thereby achieved.

The click operation of the print setting button 95 in the main menu shown in FIG. 9A allows a common print setting operation for all items displayed in the print registration display area 91. When the print setting operation is selected, a dialogue box 113 shown in FIG. 12 is displayed on the monitor 30.

The dialogue box 113 allows setting of a printer, a paper feed direction, a paper size, resolution, and the like. At the same time, setting of a register mark (i.e., whether a register mark is printed or not), setting of printing an image-title (i.e., whether an image title is printed on a paper or not), and the like can be performed.

The image title can be inputted by the key operation of the keyboard 22, and the input of the image title in the print can have an additional value.

Figure 13A:
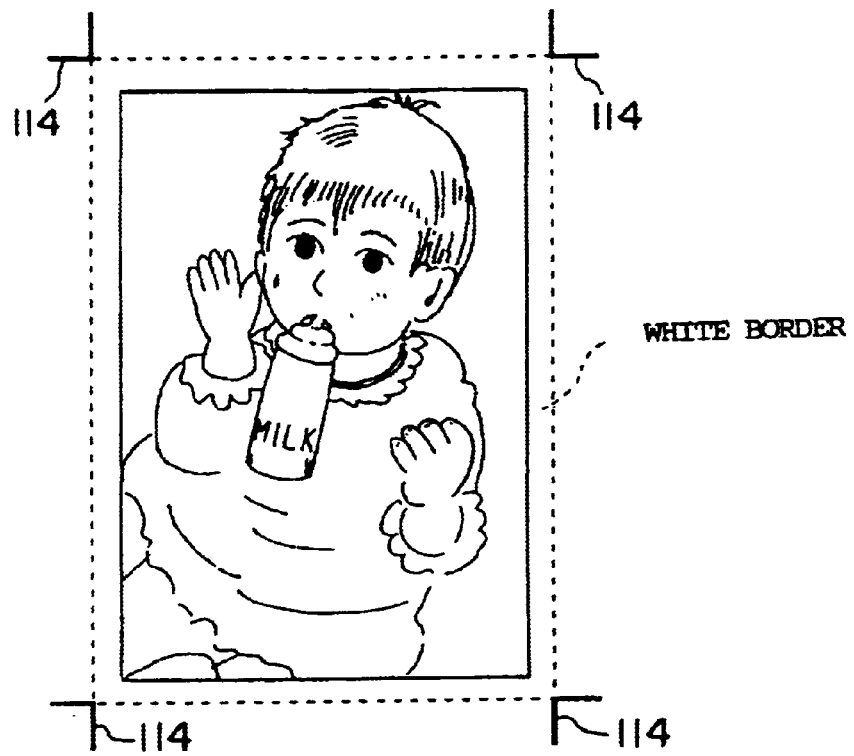
FIG. 13A is a schematic diagram showing an example of a display of a register mark on a print.

Setting of a register mark is effective only when the white border is selected. As shown in FIG. 13A, in the case of an image in which the white border is selected, a region including a white-border portion is recognized as one image and a register mark 114 is printed on each of four corners of the image. By cutting off a paper with these register marks 114 used as markers (on a line indicated by the broken line in FIG. 13A), a print with a white border having a desired width can be obtained.

Figure 13B:
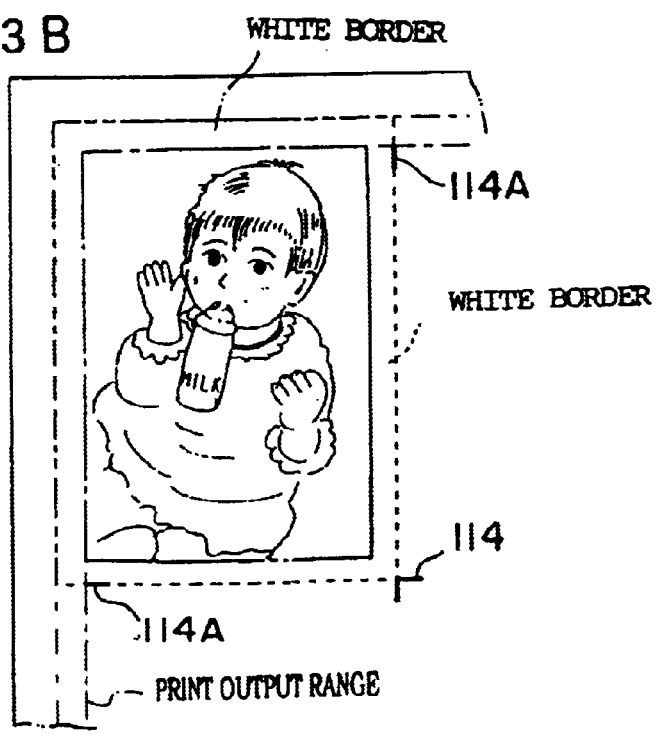
FIG. 13B is a schematic diagram showing another example of a display of a register mark on a print.

Meanwhile, as shown in FIG. 13B, when an image is disposed in a peripheral edge portion of a paper, an actual image is disposed within a print-allowed range, image layout is made so that a space portion between the print-allowed range and the peripheral edge of the paper is used as a portion of the white border, and the print-allowed range on the paper is thereby used at the maximum. At this time, modified register marks 114A are put only within the print-allowed range together with the register marks 114.

When setting of the display of the dialogue box 113 and confirmation of contents thereof are made and the click operation of the setting button 115 is effected, the output module allows automatic layout setting.

In the automatic layout setting operation, image layout is made so that the image data is included in the paper of a size which is mounted in the printer 34 on the basis of registered print setting. The automatic layer setting operation allows image layout in which the size of the paper mounted in the photographic printer 34 is changed as occasion demands so as to prevent an increase in a space portion on the paper where images are printed.

Figure 14:
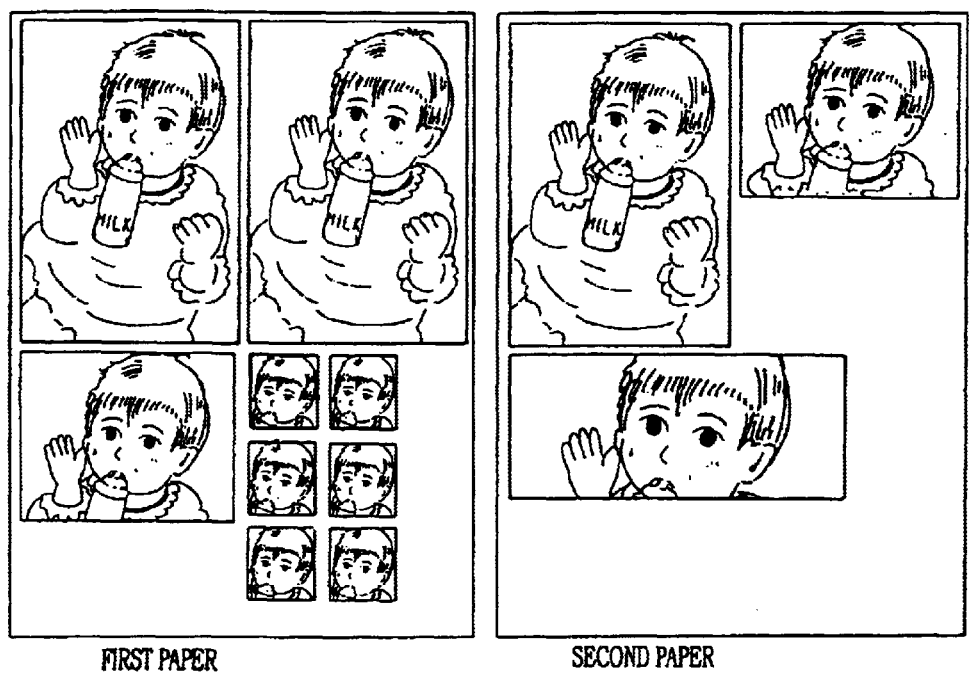
FIG. 14 is a schematic diagram showing an example of an arrangement of images printed by a photographic printer.

For example, for one registered print item (i.e., an item on one line from the print size to the number of prints in the print registration display area 91 of the main menu 90), a first print and a second print are prepared separately as occasion demands. Namely, as shown in FIG. 14, when prints of three images cannot be prepared on the first paper, these prints are necessarily prepared on two papers. At this time, images of different sizes are disposed on the first and second papers and a space portion formed in each paper is limited to the minimum.

Figure 9B:
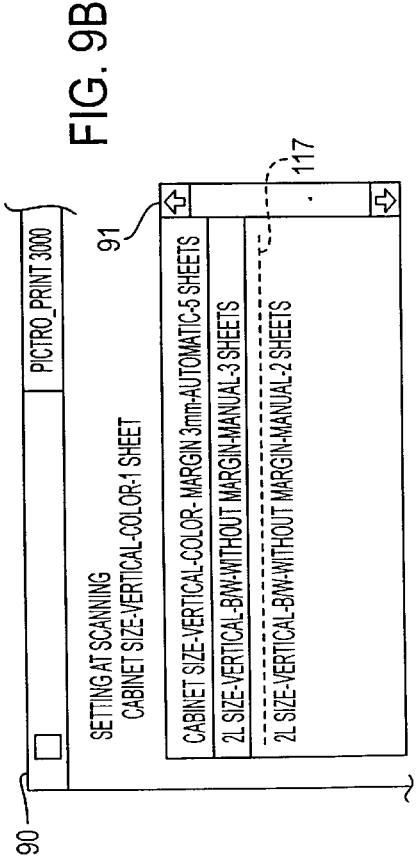
FIG. 9B is a schematic diagram showing a portion of the main menu shown in FIG. 9A with a page-eject mark added thereto.

Meanwhile, as shown in FIG. 9B, the operation of the page eject button 96 allows inputting of a page eject mark 117 between the indicating items in the print registration display area 91. The automatic layout setting operation allows layout of images for each of grouped registered items by the page eject mark 117 inputted by the click operation of the page eject button 96.

When the automatic layout setting operation is completed, the main menu 90 shown in FIG. 9A is displayed. When the click operation of a print button 116 in the main menu 90 is effected, the image data for printing for which the automatic layout is made is outputted to the photographic printer 34. Meanwhile, prior to the image data being outputted to the photographic printer 34, the results of automatic layout may be displayed on the monitor 30 so as to confirm whether the results are proper or not.

In the photographic printer 34, when the image data for printing (the print density data f) is inputted from the personal computer 12, the prints are prepared by exposing the paper in accordance with the set print conditions and layout. This makes it possible to prepare a print on which an image coincident with an image displayed on the monitor 30 is recorded.

As described above, the photographic image processing system 10 applied to the present embodiment allows an image recorded on an original to be printed by the digital exposure system, which the image having the same image quality as that of a photographic print obtained by the analogue exposure system. Further, since the image displayed on the monitor 30 can be made substantially coincident with an image printed by the photographic printer 34, a finished state of a print obtained by the photographic printer 34 from the image displayed on the monitor 30 can be properly and exactly imaged, which makes it possible to effect various image processing operations while predicting the finished state of the print.

It should be noted that, as described above, the present embodiment is used to illustrate an example of the present invention and the structure of the present invention and the flow of the processes are not limited to the same.

The above-described image processing method and apparatus according to the present invention has an excellent effect in that, when an image is printed on the basis of an image of an original by the digital exposure system in the image input system, the image can be faithfully reproduced with the element being added which does not exhibit any change in the image data read at the time of reading the image of the original.

What is claimed is:

1. An image data output method in which, when previously-stored image data to be outputted is specified and transferred to a print output device, a format necessary for printing in the print output device is set and transferred together with said image data;

wherein a plurality of kinds of image data to be outputted can be selected and a plurality of kinds of print size for an identical image data can be inputted or selected, wherein said image data is stored in such a manner as to be converted to color information when printed on a photosensitive material, and the color information is obtained by correcting said image data on the basis of characteristics of an image input device, said image input device having generated the previously-stored image data by reading a spectral sensitivity of said image input device and having been selected from a plurality of image input devices, and wherein said characteristics of said image input device include at least the spectral sensitivity thereof.

2. An image data output method according to claim 1, wherein said color information is also obtained by correcting said image data on the basis of parameters determined by combinations of print finish characteristics including at least kind of original, kind of photosensitive material, and exposure amount characteristics, which affect a print image when an image of an original is printed onto a photosensitive material by an analogue exposure system.

3. An image data output method according to claim 1, wherein, when printing is performed by using at least one print size specified or selected from the plurality of print sizes, layout information is added so that automatic layout is performed on the basis of a size of photosensitive material loaded in said print output device and said format and said image data are transferred to said print output device.

4. An image data output method according to claim 1, wherein, when said print size is not inputted or selected, or when a preceding print size is not proper, a regular size which approximates most closely a size of an image of an original when image data is read from the image of the original is automatically selected.

5. An image data output method according to claim 1, wherein, when said inputted or selected print size does not coincide with the size of the image data, enlargement, reduction, or trimming of said image data is performed, so that the image data is automatically altered to said inputted or selected print size.

6. An image data output method according to claim 1, wherein, when said image data is color image data, designation of the image data allows conversion from the color image data to monochromatic image data, and when each one is selected from a plurality of gray balance and a plurality of gradation, said color image data is converted to the monochromatic image data on the basis of the selected gray balance and gradation.

7. An image data output method according to claim 1, wherein presence or absence of a white border in a peripheral portion of the image can be selected when output of prints performed in said print output device, and when presence of the white border is selected, an index indicating a white border region is printed together with the image, and at the time of printing said index, a character or a mark which specifies the image data is printed.

8. An image data output method according to claim 7, wherein layout is automatically set so that said white border region and a non-print region to be formed in a peripheral portion of a photosensitive material in said print output device overlap with each other.

9. An image data output device in which image data is transferred to a print output device and a format necessary for printing in the print output device is set and transferred together with said image data, comprising:

image data storing means for storing a plurality of image data to be outputted;

specifying means which specifies desired image data from said image data storing means;

print-size setting means which performs one of selecting a print size for each of the image data specified by said specifying means and inputting an actual print size in said print output device;

number-of-print setting means which performs one of input and selection of the number of prints for each of the image data specified by said specifying means; and transferring means for transferring, to said print output device, the image data specified by said specifying means, and the print size and number of prints which correspond to the image data, wherein said image data is stored in such a manner as to be converted to color information when printed on a photosensitive material, and the color information is obtained by correcting said image data on the basis of characteristics of an image input device, said image input device generating said image data by reading a spectral sensitivity of said image input device and having been selected from a plurality of image input devices, wherein said characteristics of said image input device include at least the spectral sensitivity thereof.

10. An image data output method according to claim 9, wherein said color information is obtained by correcting said image data on the basis of parameters determined by combinations of print finish characteristics including at least kind of original, kind of photosensitive material, and exposure amount characteristics, which affect a print image when an image of an original is printed onto a photosensitive material by an analogue exposure system.

* * * * *